(12) United States Patent
Patterson et al.

(10) Patent No.: US 8,371,949 B2
(45) Date of Patent: Feb. 12, 2013

(54) CONSTANT VELOCITY COUPLING

(75) Inventors: Curtis Patterson, Calgary (CA); Kristjan Gottfried, Calgary (CA)

(73) Assignee: Exponential Technologies, Inc., Calgary, Alberta (CA)

(*) Notice: Subject to any disclaimer, the term of this patent is extended or adjusted under 35 U.S.C. 154(b) by 155 days.

(21) Appl. No.: 12/883,373

(22) Filed: Sep. 16, 2010

(65) Prior Publication Data
US 2011/0065518 A1 Mar. 17, 2011

Related U.S. Application Data

(60) Provisional application No. 61/243,363, filed on Sep. 17, 2009.

(51) Int. Cl.
*F16D 3/18* (2006.01)
(52) U.S. Cl. .......... 464/149; 464/139; 464/157
(58) Field of Classification Search .......... 464/106, 464/149–151, 157, 139, 904, 906
See application file for complete search history.

(56) References Cited

U.S. PATENT DOCUMENTS

| | | | |
|---|---|---|---|
| 1,241,118 A * | 9/1917 | Hoskins | 464/157 |
| 1,407,445 A | 2/1922 | Spangler | |
| 1,635,565 A | 7/1927 | Trumpler et al. | |
| 1,702,407 A * | 2/1929 | Lyman | 464/157 |
| 2,957,322 A | 2/1959 | Simons et al. | |
| 2,928,263 A * | 3/1960 | Devos | 464/157 X |
| 3,678,706 A | 7/1972 | Shirley et al. | |
| 5,846,135 A * | 12/1998 | Hoskins et al. | 464/157 |
| 2002/0094230 A1 | 7/2002 | Weckerling et al. | |
| 2010/0074786 A1 | 3/2010 | Juan et al. | |

FOREIGN PATENT DOCUMENTS

WO WO2006001622 1/2006

OTHER PUBLICATIONS

Universal Joint and Driveshaft Design Manual, AE-7, Society of Automotive Engineers, Inc., Warrendale, PA, pp. 99-101, TJ1079. S62 1979.*

* cited by examiner

*Primary Examiner* — Gregory Binda
(74) *Attorney, Agent, or Firm* — Dwayne E. Rogge; Schacht Law Office, Inc.

(57) ABSTRACT

An input shaft to output shaft coupling including an input shaft having a first wave surface thereupon, wherein the first wave surface comprises mounds and valleys. The coupling additionally comprises an output shaft having a second wave surface thereupon, wherein the second wave surface comprises mounds and valleys. The coupling in one form additionally comprises a housing substantially enclosing the first wave surface and second wave surface, wherein rotational force exerted upon the input shaft is translated through the lobes of the first wave surface to the lobes of the second wave surface and to the output shaft in turn, and wherein the first wave surface and second wave surface transmit rotational force therebetween through any range of angles to a maximum output angle between a rotational axis of the input shaft relative to a rotational axis of the output shaft.

16 Claims, 29 Drawing Sheets

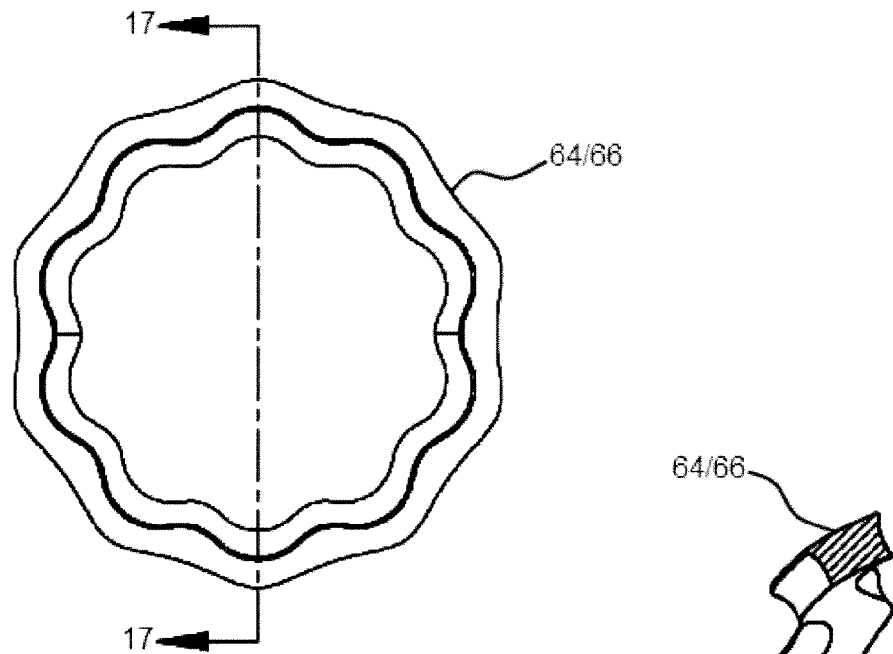
Fig. 16
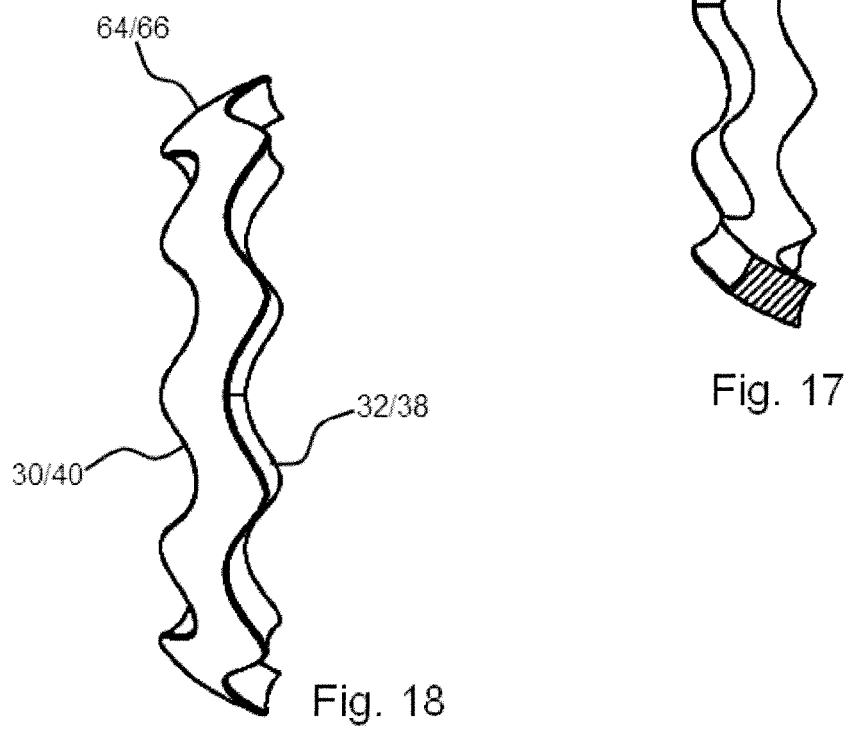
Fig. 17
Fig. 18

CONSTANT VELOCITY COUPLING

RELATED APPLICATIONS

This application claims priority benefit of U.S. Ser. No. 61/243,363, filed Sep. 17, 2009 and incorporated herein by reference.

BACKGROUND OF THE DISCLOSURE a) Field of the Disclosure

This application relates to the field of constant velocity mechanical couplings between an input shaft and an output shaft.

SUMMARY OF THE DISCLOSURE

Disclosed herein is a constant velocity coupling comprising an input shaft having a first wave surface thereupon, wherein the first wave surface comprises mounds and valleys, and an output shaft having a second wave surface thereupon, wherein the second wave surface comprises mounds and valleys. The device, in one form, utilizes a housing substantially enclosing the first wave surface and second wave surface, wherein rotational force exerted upon the input shaft is translated through the lobes of the first wave surface to the lobes of the second wave surface and to the output shaft in turn. Additionally, the first wave surface and second wave surface transmit rotational force therebetween through any angle up to a maximum output angle between a rotational axis of the input shaft relative to a rotational axis of the output shaft. In one form, the constant velocity coupling is configured wherein the input shaft is fixedly coupled to the housing to rotate and pivot therewith. To reduce friction in some applications, a first bearing set may be positioned between the first wave surface and the second wage surface to transmit rotational force therebetween. To further increase efficiency, the coupling may further utilize a wave ring comprising a plurality of wave surfaces on alternate lateral sides thereof, where each wave surface comprises a plurality of mounds and valleys. In one form, the mounds on the wave ring are operatively configured to transmit rotational force from the mounds on the first wave surface of the input shaft to the mounds on the second wave surface of the output shaft.

In one form, the constant velocity coupling is arranged wherein the wave surfaces on alternate lateral sides of the wave ring have the same number of mounds and valleys, although this and other arrangements will be described in more detail.

The constant velocity coupling may further comprise a bearing set to reduce friction. The bearing may be positioned between the first wave surface of the input shaft and the wave ring, and another bearing set may be positioned between the second wave surface of the output shaft and the wave ring. In one arrangement, the constant velocity coupling comprises yet another bearing set positioned between the first wave surface of the input shaft and the wave ring. Effectiveness of the constant velocity coupling may be improved when the bearing sets are restrained in part by bearing cages.

The constant velocity coupling is generally arranged wherein the axis of rotation of the input shaft, the axis of rotation of the output shaft, an axis of rotation of the housing, and the axis of rotation of one or more wave rings function well non-collinearly.

The constant velocity coupling described herein may be particularly arranged to resist compression forces. This may be accomplished by providing a device which further comprises a concave spherical surface provided within the housing, a convex spherical surface on the output shaft having a diameter substantially identical to the diameter of the convex spherical surface, whereupon compression forces exerted from the output shaft toward the input shaft are translated through the spherical surfaces and not through the wave surfaces. The constant velocity coupling is designed to resist compression forces and may further comprise a bearing set positioned between the concave spherical surface and the convex spherical surface.

The constant velocity coupling may be designed wherein the axis of rotation of the input shaft, the axis of rotation of the output shaft, and an axis of rotation of the housing are non-colinear. In this embodiment, the output angle is divided at each junction to reduce any single angle between rotating elements.

BRIEF DESCRIPTION OF THE DRAWINGS

FIG. 16 is an end view of a wave ring portion of the embodiment of FIG. 1.

FIG. 17 is a cutaway view of the embodiment of FIG. 16 taken along line 17-17.

FIG. 18 is a side view of the embodiment of FIG. 16.

FIG. 26 is an isometric view of a shaft portion of the embodiment shown in

FIG. 21.

DESCRIPTION OF THE PREFERRED EMBODIMENTS

Figure 1:
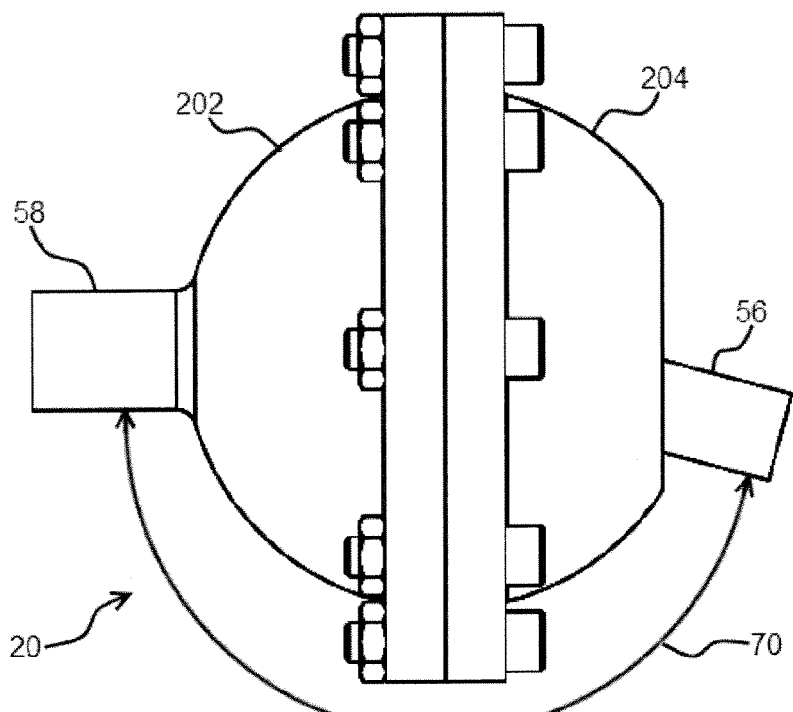
FIG. 1 is a side view of one embodiment of a constant velocity (CV) joint.

Disclosed herein is an embodiment of a new coupling design, herein referred to as a "CvR Coupling." Methods for producing several components of this disclosure are disclosed in U.S. application Ser. No. 12/560,674, filed on Sep. 16, 2009, and incorporated herein by reference. Constant velocity couplings differ from other couplings, such as standard U-joints, in that CV joints do not have an appreciable variation of the transmitted speed through a rotation.

The term bearing or bearing set is used to denote not only spherical (ball) bearings or sets of spherical bearings, but also rolling members such as, conical rollers (taper rollers), cylindrical rollers, spherical taper rollers, spherical cylindrical rollers, non-circular rollers, or even rollers that have small gear teeth on the periphery, that mate with small gear teeth on the wave surfaces as an example. Cage design could also become more complex than those shown in the accompanying figures, and rollers be complex, in that the rollers may for example be just like "track rollers" (with individual smaller shafts extending out of the rollers) and the cage could be rigidly fixed to these shafts of the track rollers, cage providing equal spacing and angle of the track rollers. The advantage of different roller designs, such as the taper roller, is higher load and torque capacity, since a conical roller has a larger contact patch and lower contact stresses, than say, a ball bearing. Also, some rolling elements such as the spherical taper roller bearing, may have self-aligning properties that may be of benefit in some designs.

This CvR coupling may be configured to function in much the same way as a typical constant velocity (CV) joint commonly used in a car. The embodiments disclosed herein comprise several advantages over the prior art, including lower friction and a high thrust and tension capacity. In comparison to a prior art Thompson-style coupling, this embodiment is potentially more compact and simpler to make. The disclosed embodiments may be designed to be very strong, and may be particularly designed to take heavy compression or tension loads and torque loads.

The Thompson constant velocity joint (TCVJ), also known as a Thompson coupling, consists of two cardan joints assembled within each other, thus eliminating the intermediate shaft, along with a control yoke that geometrically constrains their alignment. The control yoke maintains equal joint angles between the input shafts and a relative phase angle of zero to ensure constant angular velocity at all input and output shaft angles. While the geometric configuration does not maintain constant velocity for the control yoke (aka intermediate coupling) that aligns the pair of cardan joints, the control yoke has minimal inertia and generates virtually no vibration. Eliminating the intermediate shaft and keeping the input shafts aligned in the homokinetic plane virtually eliminates the induced shear stresses and vibration inherent in traditional double cardan shafts.

Figure 3:
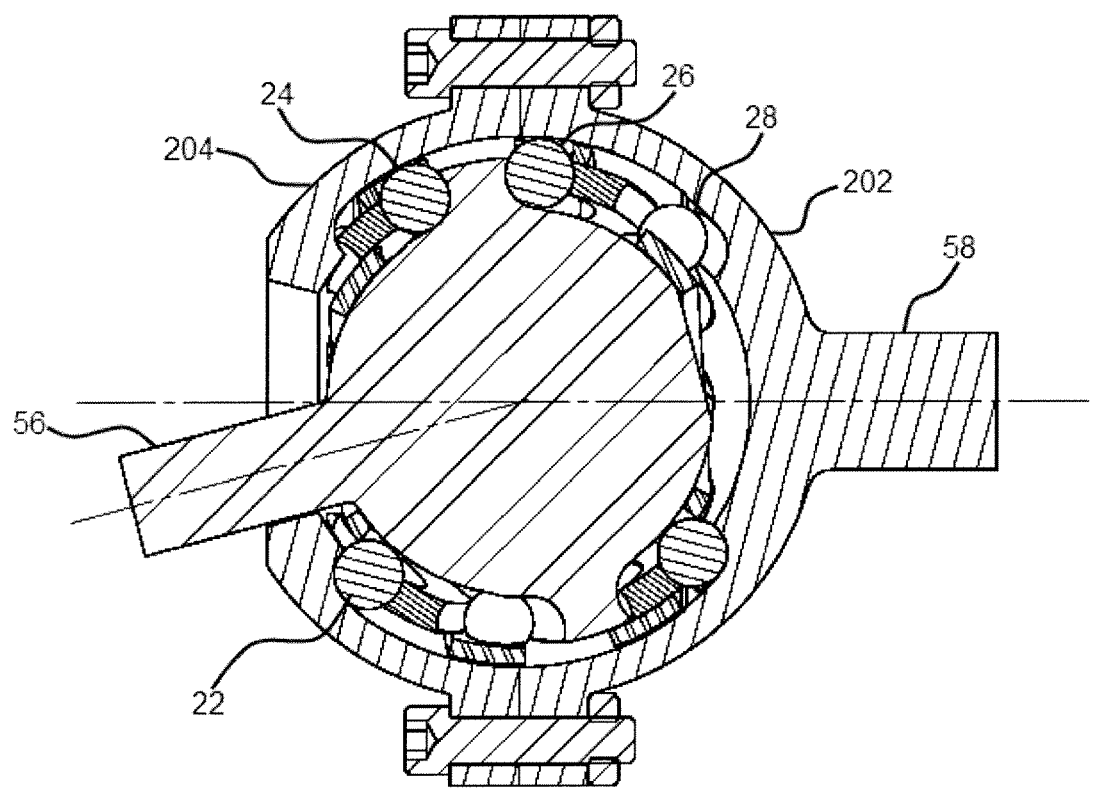
FIG. 3 is a cutaway view of the embodiment shown in FIG. 2 taken along line 3-3.
Figure 4:
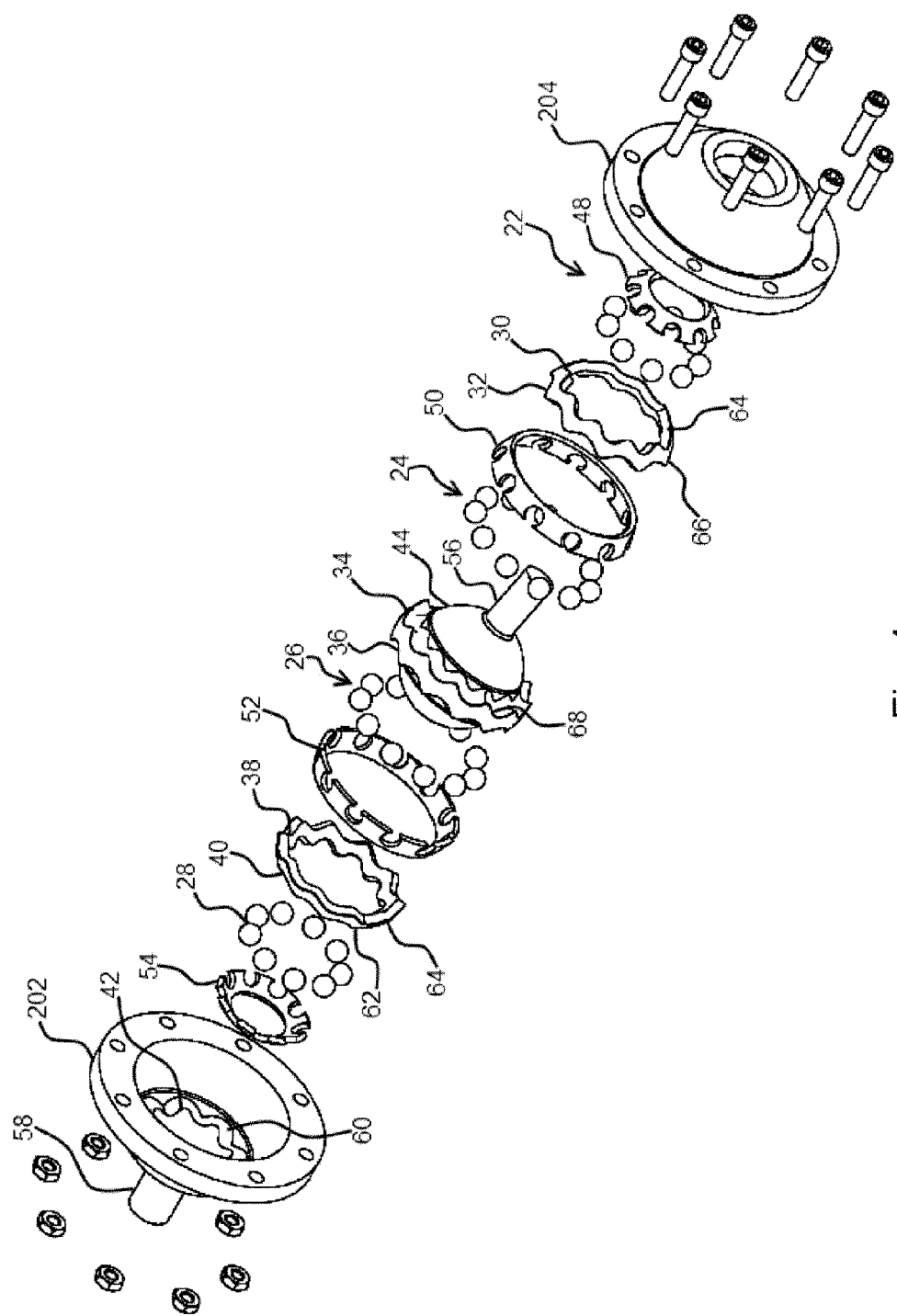
FIG. 4 is an isometric exploded view of the embodiment shown in FIG. 1.
Figure 5:
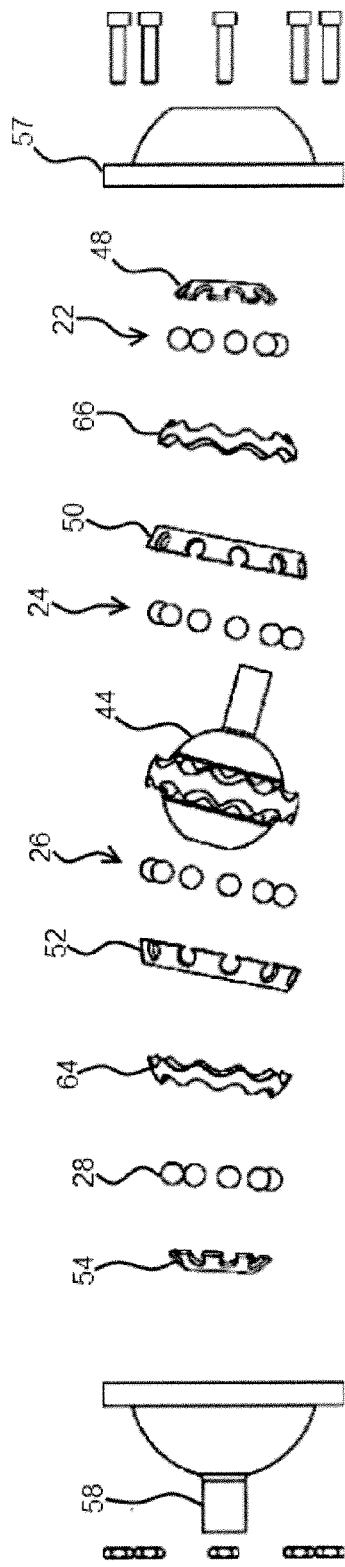
FIG. 5 is a plan exploded view of the embodiment shown in FIG. 1.
Figure 6:
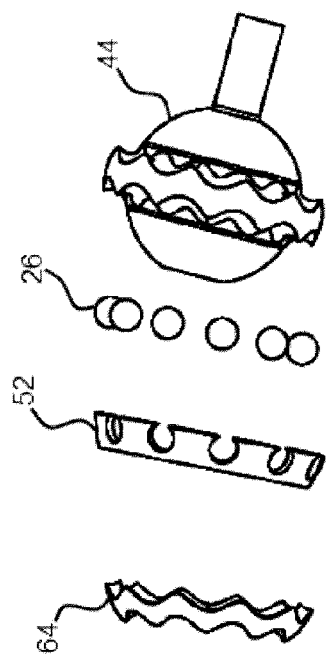
FIG. 6 is a detail view of a portion of FIG. 5.
Figure 7:
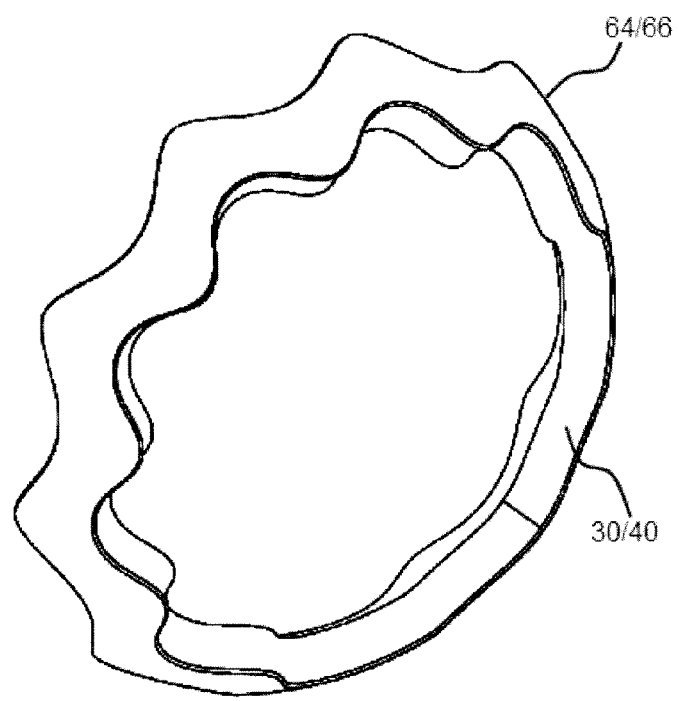
FIG. 7 is a detail view of the wave ring shown in FIG. 6.
Figure 8:
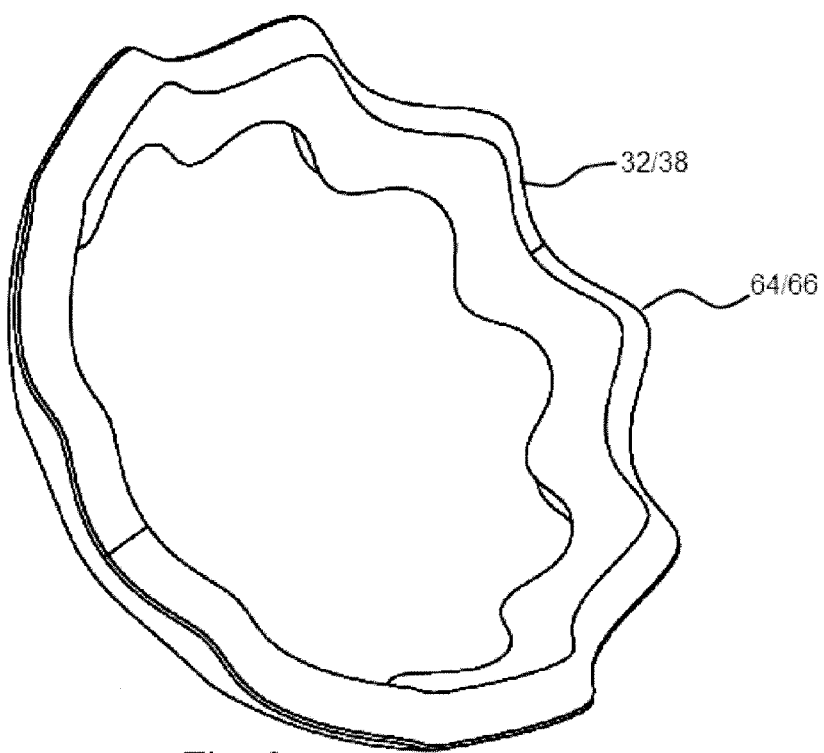
FIG. 8 is a detail view of the embodiment of FIG. 7 from an opposing view.
Figure 9:
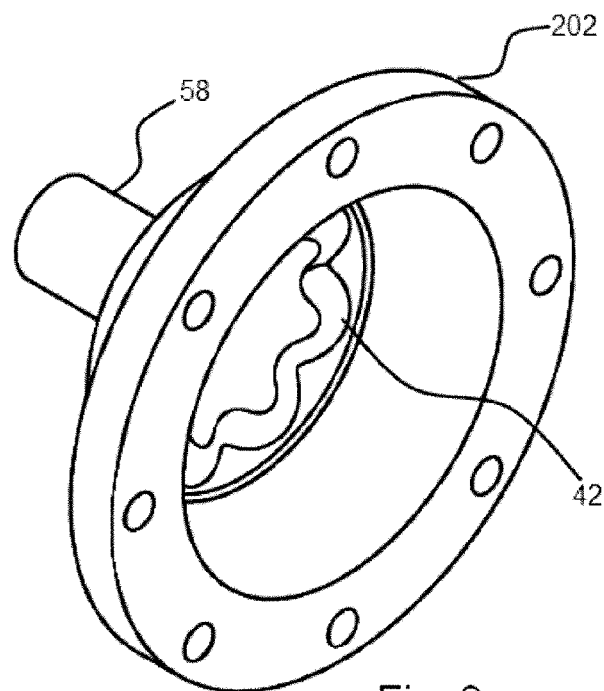
FIG. 9 is an isometric view of a shaft/housing portion of the CV joint shown in FIG. 1.
Figure 10:
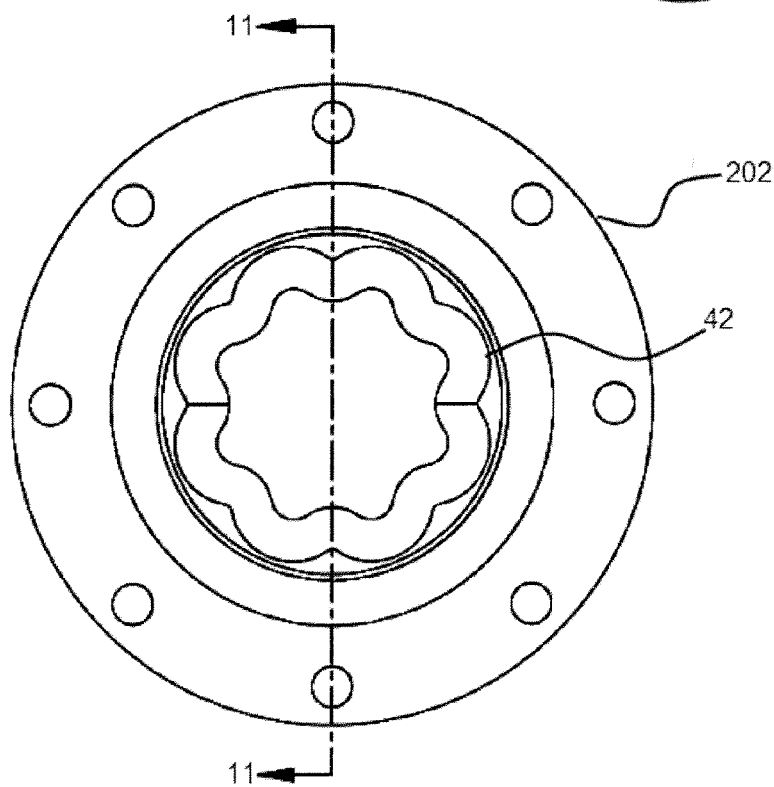
FIG. 10 is an end view of the embodiment of FIG. 9.
Figure 11:
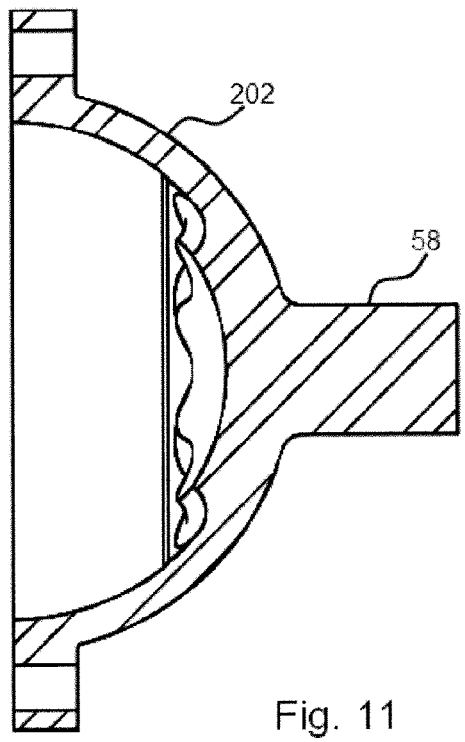
FIG. 11 is a cutaway view of the embodiment of FIG. 10 taken along line 11-11.
Figure 12:
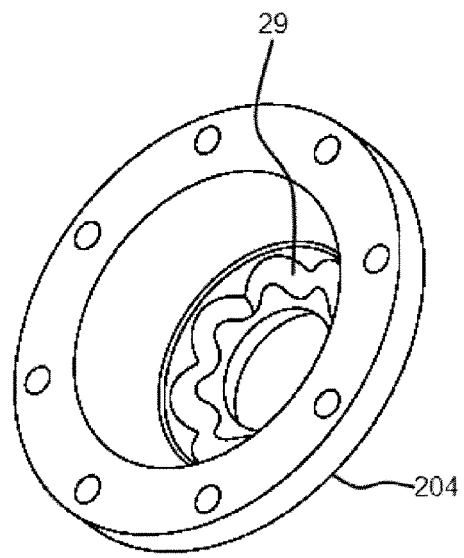
FIG. 12 is an isometric view of an end cap portion of the embodiment of FIG. 1.
Figure 13:
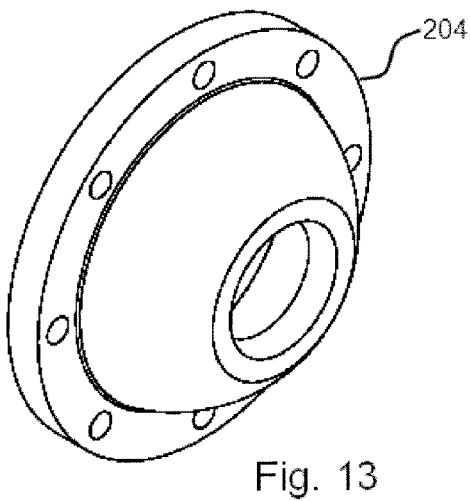
FIG. 13 is an isometric view of the embodiment of FIG. 12 from an opposing angle.
Figure 14:
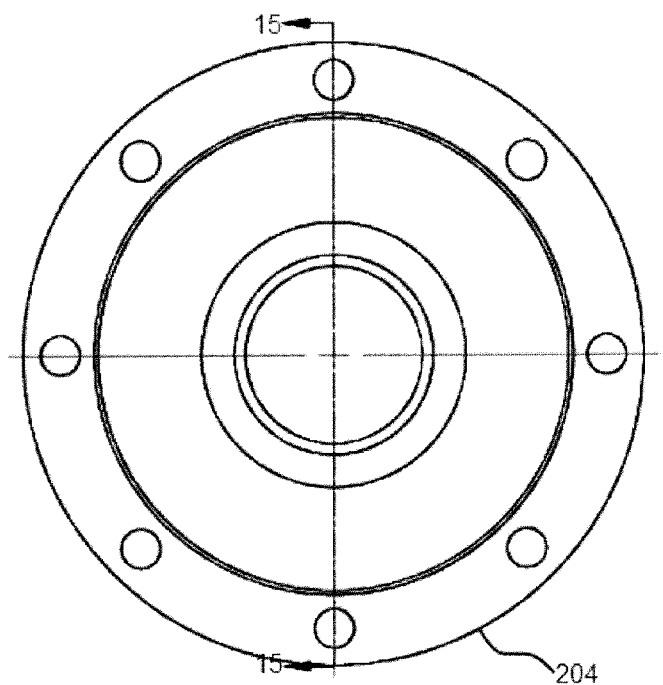
FIG. 14 is an end view of the embodiment of FIG. 12.
Figure 15:
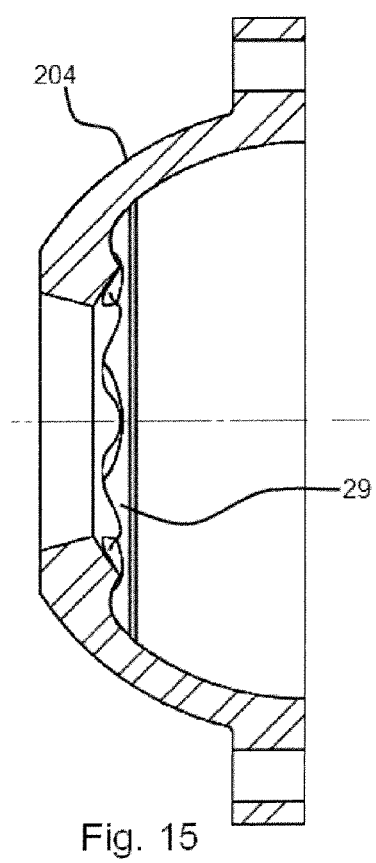
FIG. 15 is a cutaway view of the embodiment of FIG. 14 taken along line 15-15.
Figure 19:
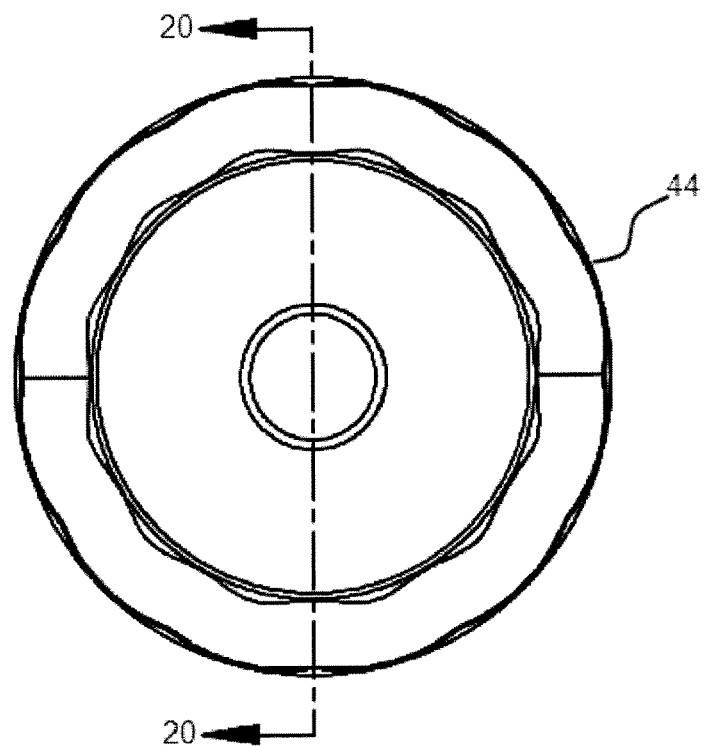
FIG. 19 is an end view of a shaft portion of the embodiment of FIG. 1.
Figure 20:
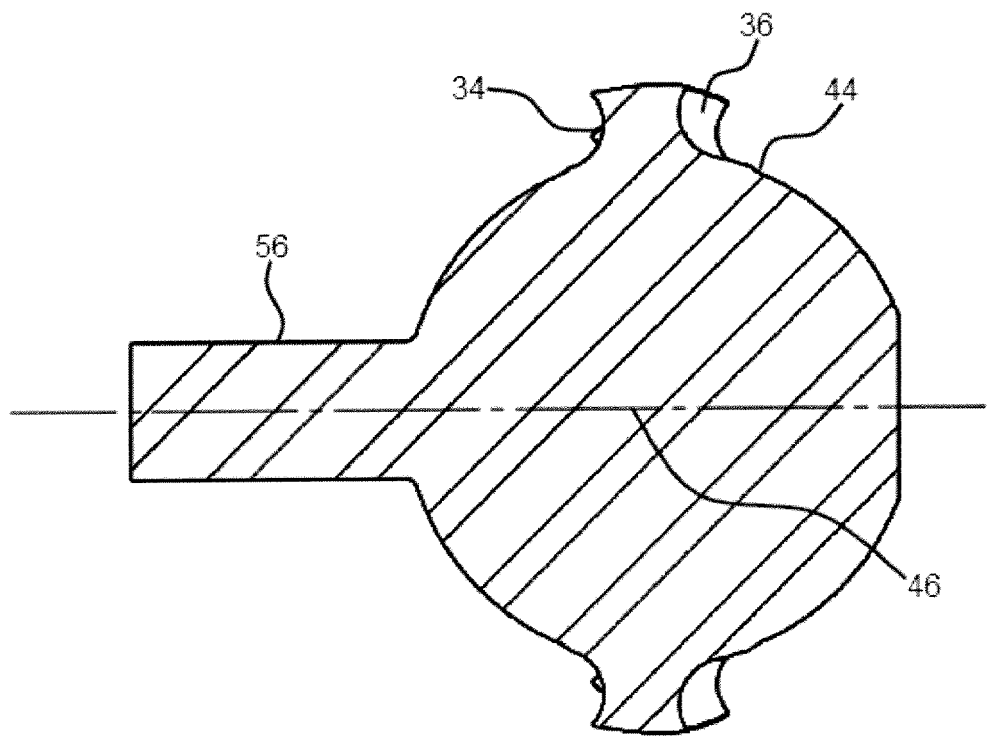
FIG. 20 is a cutaway view of the embodiment of FIG. 19 taken along line 20-20.
Figure 21:
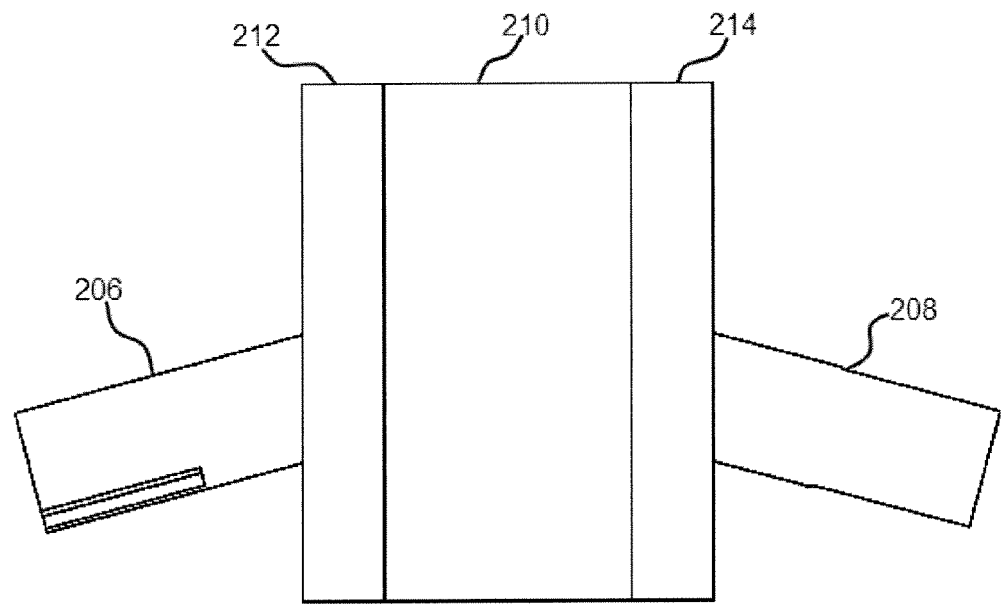
FIG. 21 is a side view of a second embodiment from that is shown in FIGS. 1-20.
Figure 22:
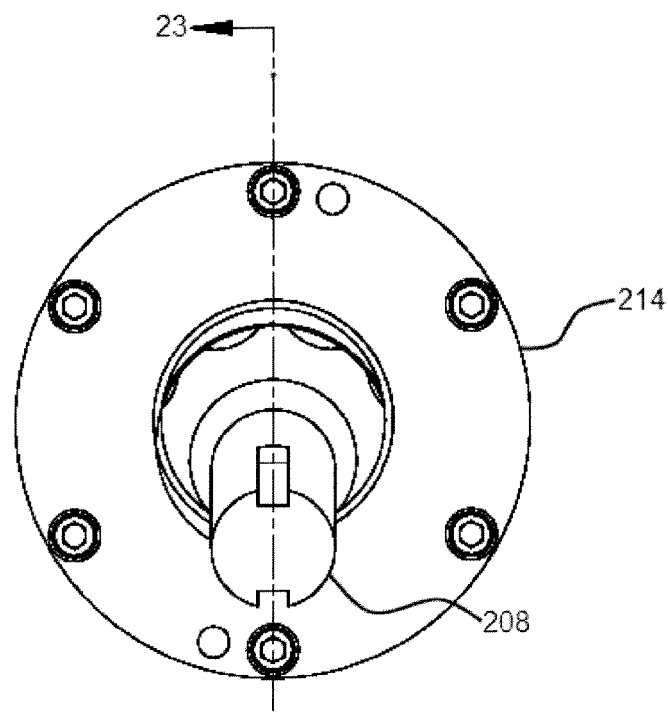
FIG. 22 is an end view of the embodiment shown in FIG. 21.
Figure 23:
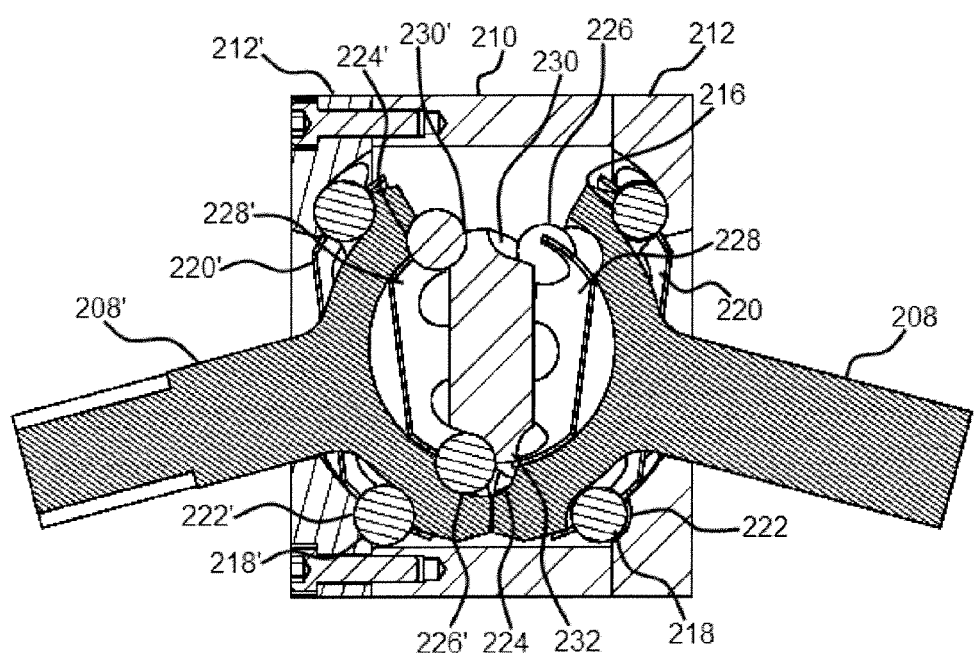
FIG. 23 is a cutaway view of the embodiment shown in FIG. 22 taken along line 23-23.
Figure 24:
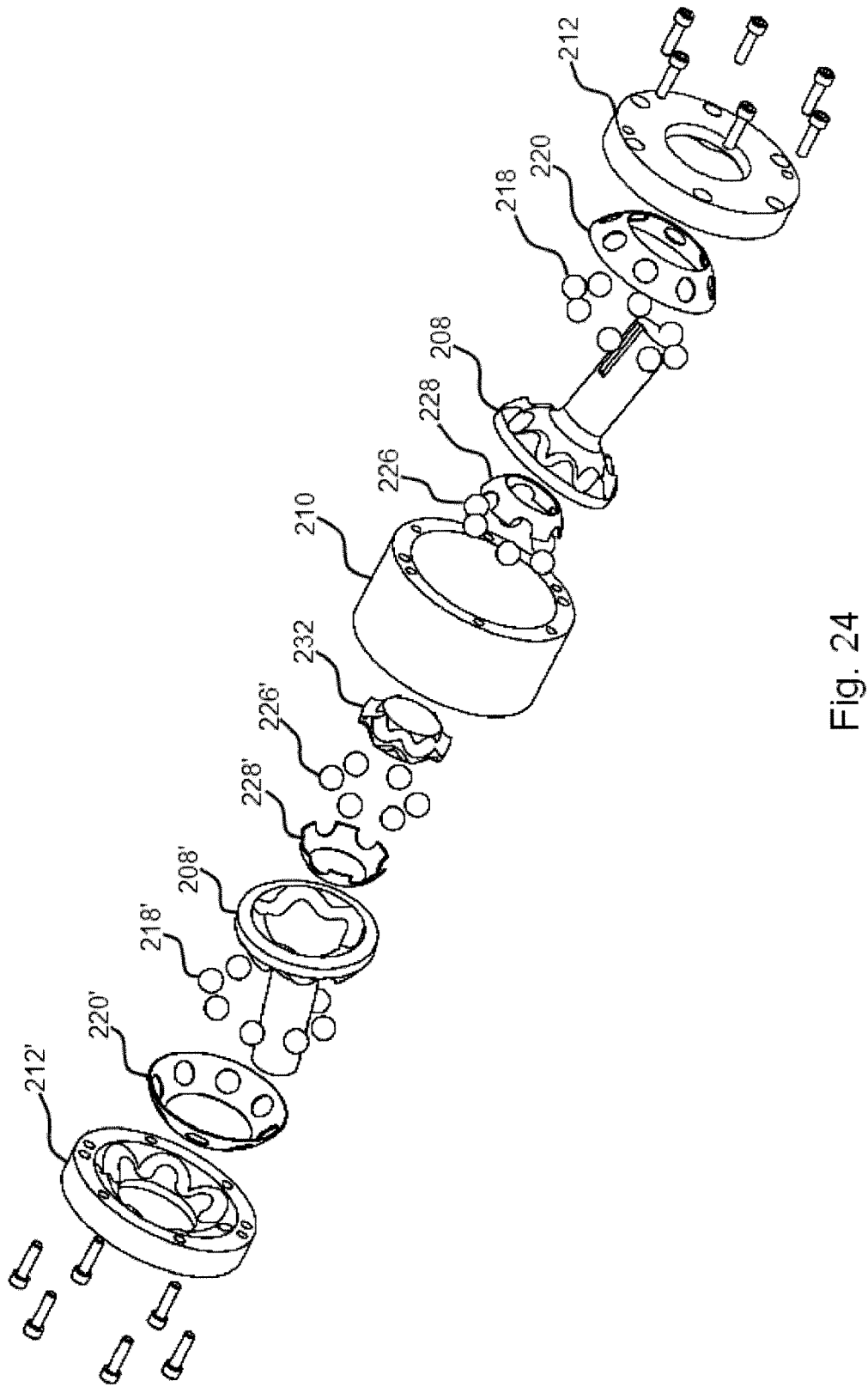
FIG. 24 is an isometric exploded view of the embodiment shown in FIG. 21.
Figure 25:
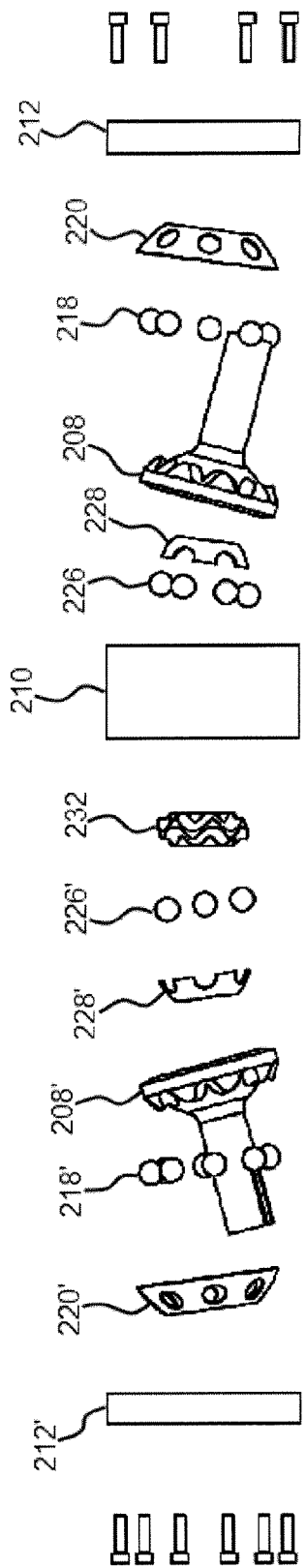
FIG. 25 is a plan exploded view of the embodiment shown in FIG. 21.
Figure 26:
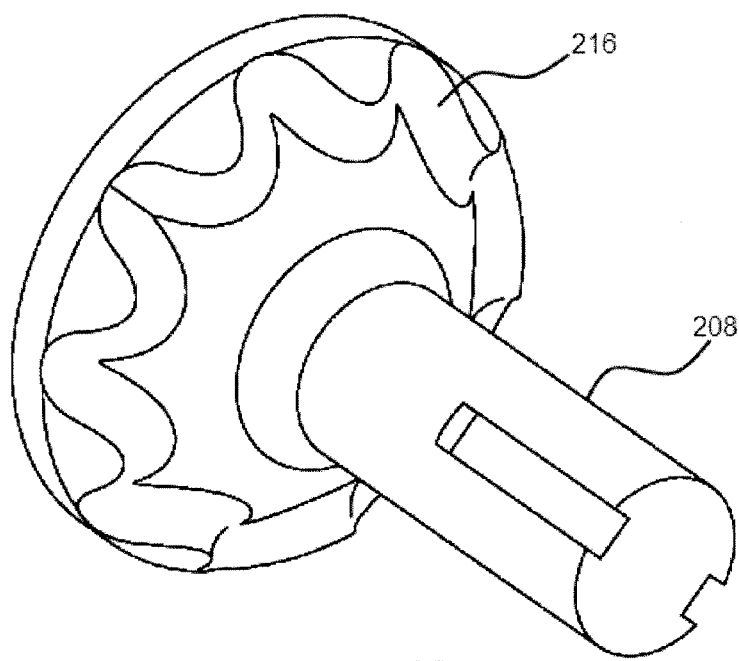
Figure 27:
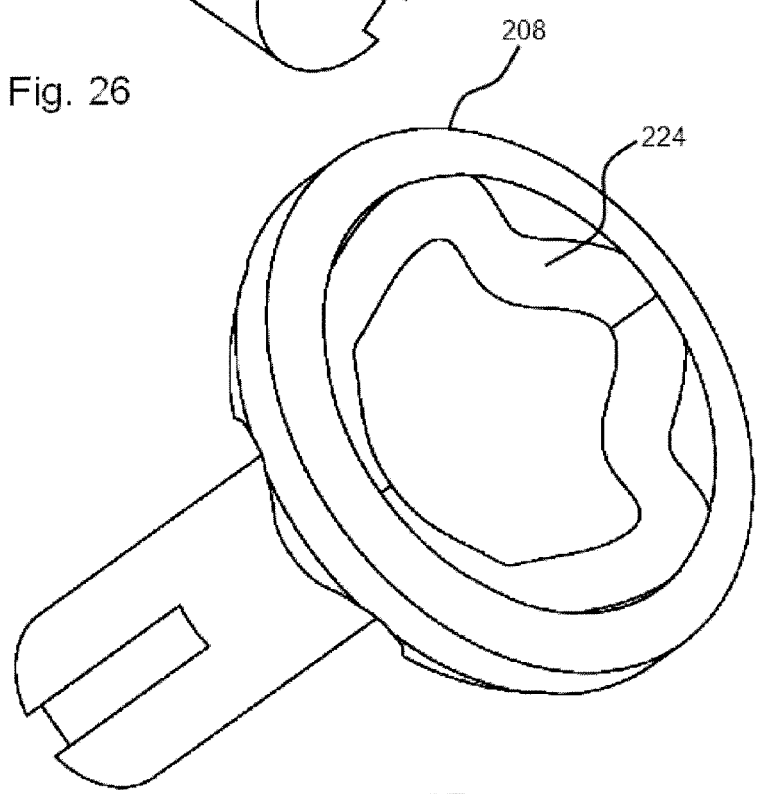
FIG. 27 is an isometric view of the embodiment of FIG. 26 from an opposing angle.
Figures 28, 29:
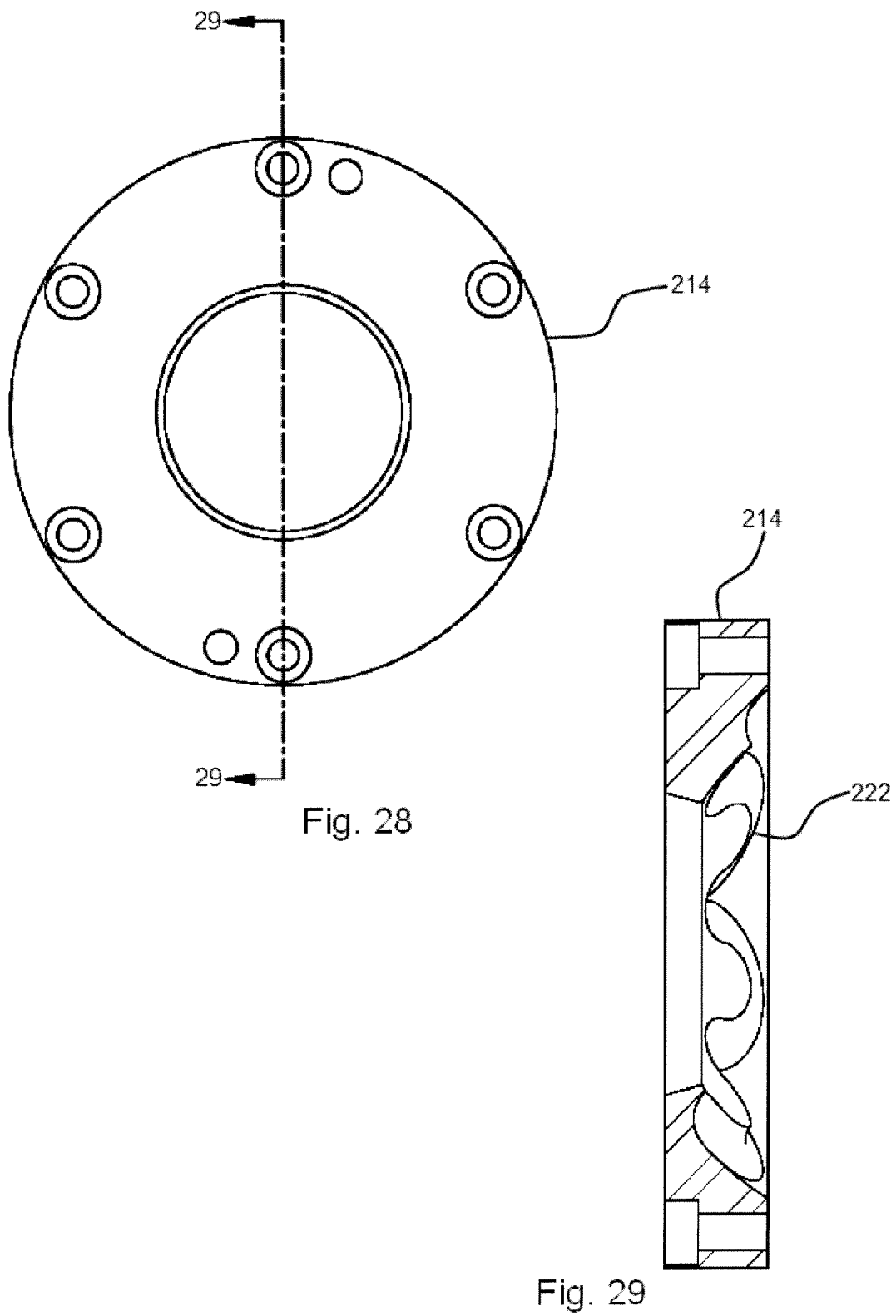
FIG. 28 is an end view of an end cap portion of the embodiment shown in FIG. 21.
FIG. 29 is a cutaway view of the embodiment of FIG. 28 taken along line 29-29.
Figure 30:
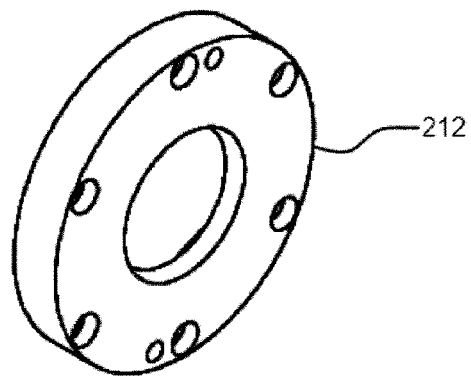
FIG. 30 is an isometric view of the embodiment of FIG. 28.
Figure 31:
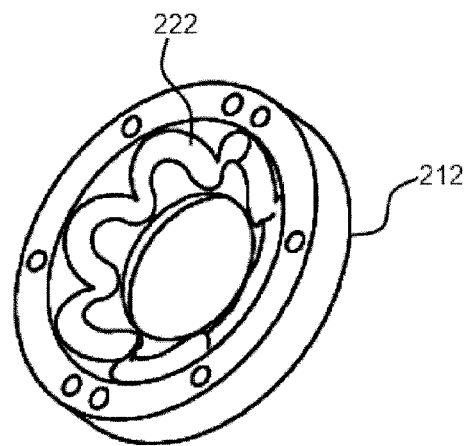
FIG. 31 is an isometric view of the embodiment of FIG. 30 from an opposing angle.

In one form, shown in FIGS. 1-20, the disclosed embodiment 20 is comprised of several sets of ball bearings most easily seen in FIG. 4, and each set of ball bearings 22, 24, 26, and 28 has a corresponding set of wave surfaces 29 (see FIG. 12), 30, 32, 34, 36, 38, 40 and 42. The wave surfaces engage opposing sides of the bearing sets, and the mathematics of the base curves defining the wave surfaces are derived from previous mathematics disclosed in the '674 application referenced above. To form these wave surfaces in one form, a spherical cutter is swept along the base curves to create the wave surfaces. In one embodiment, the ball bearings sets 22, 24, 26 and 28 are positioned such that the distance from the center of each bearing to the spherical center of the device (at the center 46 (see FIG. 20) of the spherical surface 44) is substantially identical. The bearing sets need not all be on the same spherical location from the center 46; although the embodiments shown in the attached FIGS. 1-20 are shown equidistant from the center 46, one could create a staggered formation such that some bearings lie closer to the center 46 than others. One example of this arrangement is shown in the embodiment depicted in FIGS. 21-34.

One embodiment that would benefit from a staggered formation of bearing sets would be an embodiment where the center two sets of bearing sets are closer to the center 46 of the device. In such an embodiment, the device may be better at taking side-loads, whereas in the embodiment shown in FIGS. 1-19 may not be optimal for side loading of the input/output shafts. One benefit of having staggered bearings at different radii from the center, such as are shown in the embodiment of FIGS. 21-34, would be potentially better utilization of space and/or a more compact design satisfying the same load requirements.

Cages 48, 50, 52, and 54 have been incorporated in some embodiments to improve the stability of the bearings, to ensure bearings do not go off track and cause the device to lock up. Testing has shown that that, in one form, without a cage, the bearings may have a tendency to go slightly off track and jam up the device or cause unwanted vibrations. Testing has been accomplished at high speeds with a single set of bearings and a cage to confirm theoretical suppositions. The cages in one form are designed to keep the bearings equally spaced from each other, and to have a very close fit to the bearings to ensure they are accurately spaced.

Figure 2:
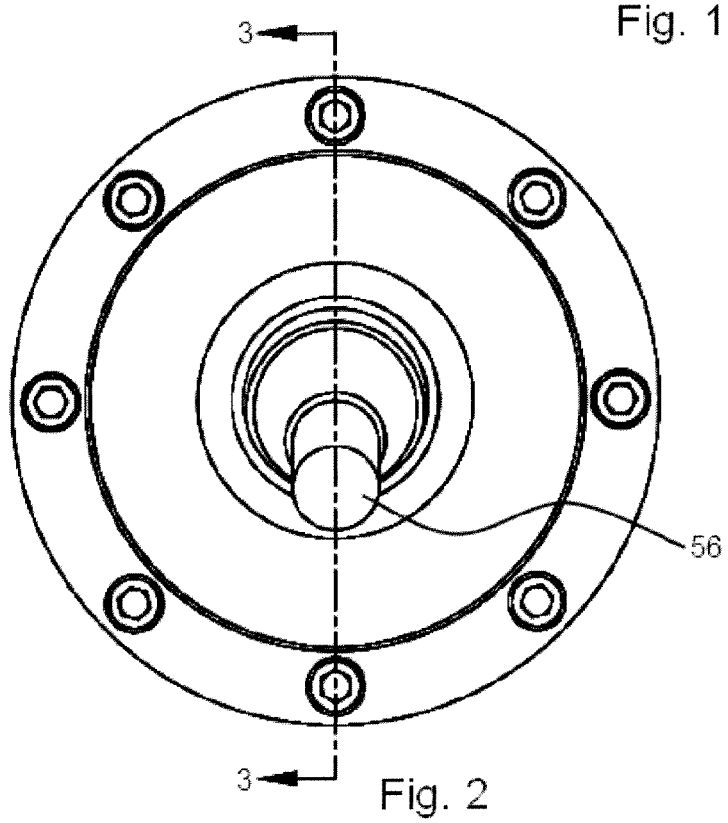
FIG. 2 is an end view of the embodiment shown in FIG. 1.

The bearing sets in the embodiment of FIGS. 1-3 comprise sets of nine individual balls (bearings) in sets 22 and 28 and eleven individual balls in sets 24 and 26. The bearings have been shown, in one embodiment, with the wave surfaces arranged in such a way that the central shaft 56, in one form, spins at a speed that is 67% of the speed of the outer housing shaft 58. The number of mounds 60 on the housing rotors (surface 42), in one form, numbers eight, and the wave rings 64 and 66 that fit between the bearing sets, in one form, comprise ten mounds 62 and 63 on each side. In one form, there are twelve mounds 68 in two locations (surfaces 34 and 36) on the central shaft sphere 44. A housing comprising an outer housing 202 and end cap 204 substantially enclose the working components to protect the working surfaces as well as to provide structural support to the joint. This arrangement results in an overall gear ratio of 8/12=2/3 or 67%. In other forms, designs with speed ratios of anywhere from 1:1 to about 3:1 are conceived, depending on what combinations of bearings and wave surfaces are used, and depending on the design the speedup would occur on the central shaft 56 or the outer housing shaft 58. The present embodiment, in several forms, allows'for an infinitely variable output angle 70 (see FIG. 1) anywhere from −15 to 15 degrees of play. Other designs are conceived that could give 20 degrees or more, and with a 2-sets-of-bearings configuration, the embodiments in several forms consist of +/−40 degrees of play, depending on design requirements. In one embodiment consisting of 40 degrees, a 2 set design is conceived with the bearings positioned away from the central shaft, that is, a design that is meant to take up compression but may not be optimized for tension.

The embodiment illustrated in FIGS. 1-20 is configured for both tension and compression loads with minimal friction. In another form, a user may remove two sets of bearings on one side of the device, resulting in the device being more efficient for either tensile or compressive loading conditions.

In yet another example, the coupling may be designed with two sets of bearings such that the design is optimal for tensile loads. In this design, the central ball shaft would have a spherical surface 76 on the end similar to that shown in FIGS. 35-49 that is configured to fit into a spherical socket 72 on the outer housing shaft 74, and this spherical surface 76 would, in one form, reduce sliding friction under compressive loading, reducing heat and loss of transmission efficiency. Similarly for a coupling designed for tensile loading, one could design the coupling so that the same arrangement is provided on the opposite side, or one could design the device to take only compressive loads.

In the particular embodiment of FIGS. 1-20, there is a total of +/−15 degrees of play, and the alpha angle "p" (output angle 70) used in the base curve equations is 15/4=3.75 degrees. In one form, it is desirable to use the same "p" angle for all of the base curves, as this allows for the device to have a full range of motion that is infinitely continuous up to an angle of zero (where both shafts are aligned). The offset angles "a" (see U.S. application Ser. No. 12/560,674) are chosen appropriately so as to be spaced around the device to optimize space usage and selected to thicken material in places to improve the strength of the various components. There is a limitation to the number of individual bearings that can be used in the bearing sets in each embodiment. This limitation is such that the diameter of the bearings must not be so great that the trochoidal toroidal shaped race surfaces self intersect and rolling contact would no longer necessarily be smooth, as some backlash could result. For example, a CvR coupling with a larger range of angular motion could be configured with smaller bearings than a device configured for a smaller range of angular motion. However, one could also design the wave surfaces for fewer individual bearings. In this case, the base curve waves become gentler and less aggressively curved, and larger individual bearings could be used. The overall diameter of the device is also a factor in the design, such that a larger device diameter allows for larger bearings, but the disadvantages being larger rotational inertia and greater weight. Therefore, when sizing a coupling to take a certain load limit and to minimize weight, important sizing parameters to be considered include bearing size, distance from the bearings to the center of the device, number of individual bearings, and overall angular play, as all of these parameters affect each other in the design.

One of the beneficial properties of this CvR coupling is zero backlash when the parts are machined appropriately for this property. In addition, this design comprises the benefits of low friction, ability to take thrust, tension, side load, rolling contact, low heat generation, ability for running at very high speeds, all components are rotationally balanced, and the coupling may be designed for optional ability to provide a compact gear ratio between input and output shafts. More benefits are easy to make, easy to assemble, compact, and comprise high load capacity, high vibration resistance, and reliability.

Another feature of a CvR coupling in view of the Thompson coupling is that a CvR coupling can be made with a large hollow bore passing through the coupling, that is, the input and output shafts could be hollow to allow for something to go through, for example a fluid (in down hole directional drilling applications), a human arm (perhaps in robotic suits for military application), flexible tubing, etc. The thin shaft shown in these embodiments can be made much thicker in diameter so as to locate the bearings further from the output axis of the inner shaft, and other parameters change appropriately.

Typically, CV joints in a car have a rubber boot that holds grease inside. Such a rubber boot may be incorporated into the design of a CvR coupling for lubrication, and a rotating seal could be utilized, in one form, on one end of the boot if the CvR coupling is designed with a speed ratio.

Another variation on the bearing design of the CvR coupling is an arrangement that may not have any bearings at all, such as the one shown in FIGS. 35-49, which uses a wave-on-wave gearing design. This embodiment comprises a housing shaft 74 extending from an outer housing 90, which may in turn comprise an end cap 92. The end cap 92 may be attached to the outer housing 90 by way of fasteners 94. The other shaft 96 fits partially within the outer housing 90 and is held in place in part by the end cap 92. As elsewhere described, the spherical surface 76 of the shaft 96 engages the spherical surface 72 of the outer housing 90. This spherical surface is a concave surface on the inner portion of the outer housing 90. The shaft 96 further comprises a wave surface 98 operably configured to engage a wave surface 100 on a wave ring 106. The wave ring comprises two wave surfaces 100 and 102, wherein the wave surface 102 is operably configured to engage a wave surface 104 provided on the end cap 92. Looking to FIGS. 40-43, it can be seen how the wave ring comprises mounds 108 and valleys 110. Gearing embodiments of such a CvR coupling would have the advantage of more simplicity and fewer moving parts since there may be no bearings, a potentially more compact design, and potentially much higher load and impact capacity in comparison to the bearing versions. The CvR coupling without bearings would be particularly applicable in severe load applications. However, friction, heat, and higher rate of wear may need to be closely monitored, since the design may comprise frictional contacts between the components, and lubrication becomes more of an important issue than with the bearing design.

A CvR coupling can be constructed of spherical trochoidal surfaces that are paired up such that there are at least 2 sets of conjugate pairs of these surfaces. As the CvR coupling operates, all parts in the illustrated embodiments will rotate substantially in unison. In the embodiments utilizing bearings, for every pair of wave surfaces there may be one set of bearings. In the case of geared contact surfaces, such as is shown in FIGS. 35-49, there are wave surfaces with N and N+1 or N−1 numbers of mounds. In the case of with bearings, such as shown in FIGS. 1-34, the wave surfaces use N and N+/−2 mounds. Note that the CvR coupling can be designed symmetrically so that the trochoidal surfaces are a mirror image from one shaft side to the other, resulting in a 1:1 speed ratio. If, however, the number of lobes going from one side of the device to the other is no longer symmetric, to the device will have an inherent speed ratio or a gear reduction within the coupling itself. For applications that require a fixed change in speed ratio, this is potentially a useful feature of the CvR coupling.

A joint that has two sets of surfaces (or two bearing sets) is one of the simplest designs of a working CV joint, and axial loads will be transmitted in only one direction—either under compression or tension, through the bearings or geared contact. Design additions may be added for loads that may act in the opposite axial direction, such as a lubricated spherical frictional contact surface 76, such as shown in FIGS. 35-49, provided in one form on the shaft with a gear shape thereupon. To take up compression loads, this spherical surface 76 takes up a load and should therefore be lubricated and designed to do so tribologically along with the socket 72 it fits into. To reduce friction, elements such as spherical bearings that slide along between the spherical surfaces may be incorporated to help create some rolling contact between the surfaces. In this particular design, shown in FIG. 38, seal grooves 78 and 80 are shown such that the assembly could be packed with grease or other lubricants. For designs that have 4 pairs of trochoidal surfaces, the device may be designed to take up both compression and tensile loads along the axial direction of the device; examples of this are shown in FIGS. 1-34, 50, and 51.

On the other hand, the embodiment shown in FIGS. 35-49 and 52 is designed to transmit a tensile load through geared contact (or rolling contacts through the bearings) and compressive forces through the spherical surface 76. For the bearing design shown in FIG. 52, this arrangement would mean that the joint operates with less friction and greater efficiency when subject to a tension load. The embodiment shown in FIG. 52 comprises a housing 118 coupled to an end cap 120, wherein the housing 118 comprises a housing shaft 122. A shaft 124 fits partially within the housing/end cap, similar to the embodiment of FIGS. 35-49. The embodiment of FIG. 52 differs in the addition of bearing sets 126 and 128, which engage wave surfaces 130 and 132 as well as wave surfaces on the wave ring 134.

Figure 52:
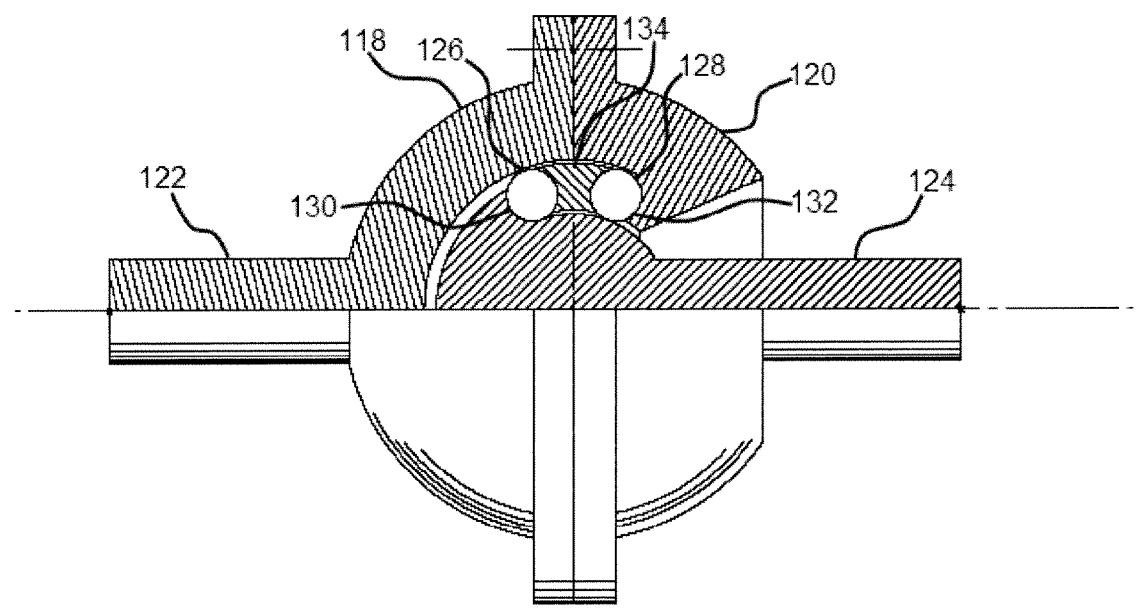
FIG. 52 is a partial cutaway view of an alternate embodiment of a CV joint.
Figure 53:
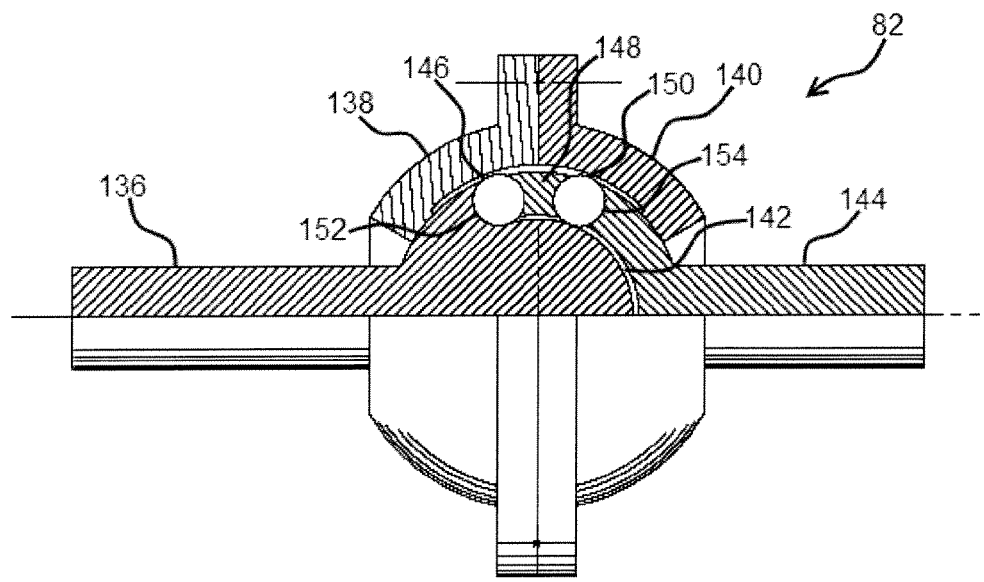
FIG. 53 is a partial cutaway view of an alternate embodiment of a CV joint.

FIG. 53 illustrates a design similar to FIG. 52 that would operate more efficiently with compression load. In the embodiment of FIG. 53, the shaft 136 not only fits within the housing provided by end caps 138/140, but also fits partially within a concave spherical surface 142 of the shaft 144. A first bearing set 146 engages wave surface 152 on the shaft 136 and one side of the wave ring 148. A second bearing set 150 engages wave surface 154 on the shaft 144 and a second side of the wave ring 148.

Figure 50:
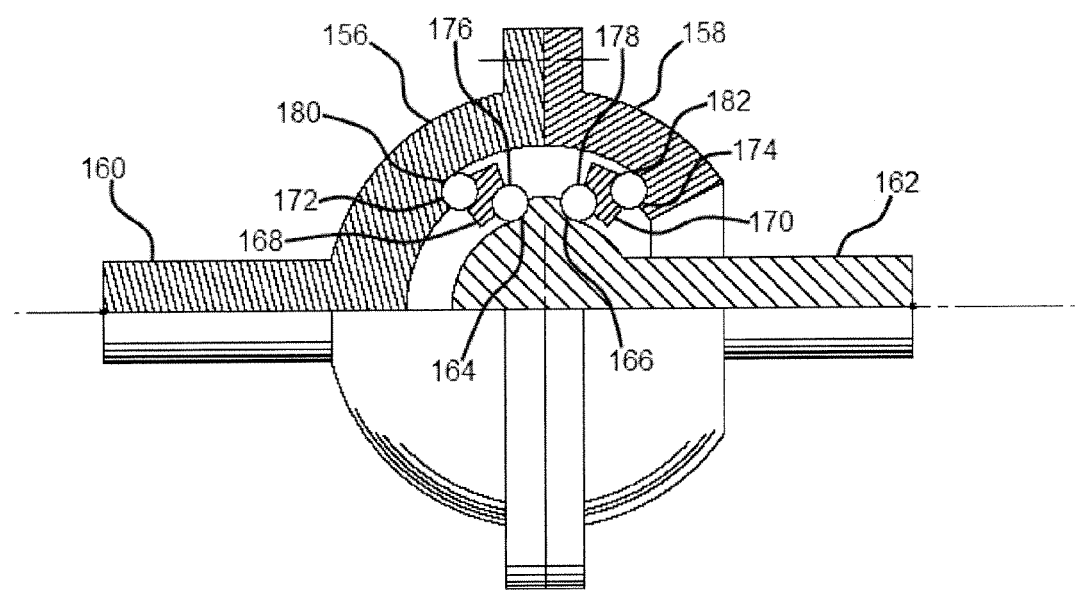
FIG. 50 is a partial cutaway view of an alternate embodiment of a CV joint.
Figure 54:
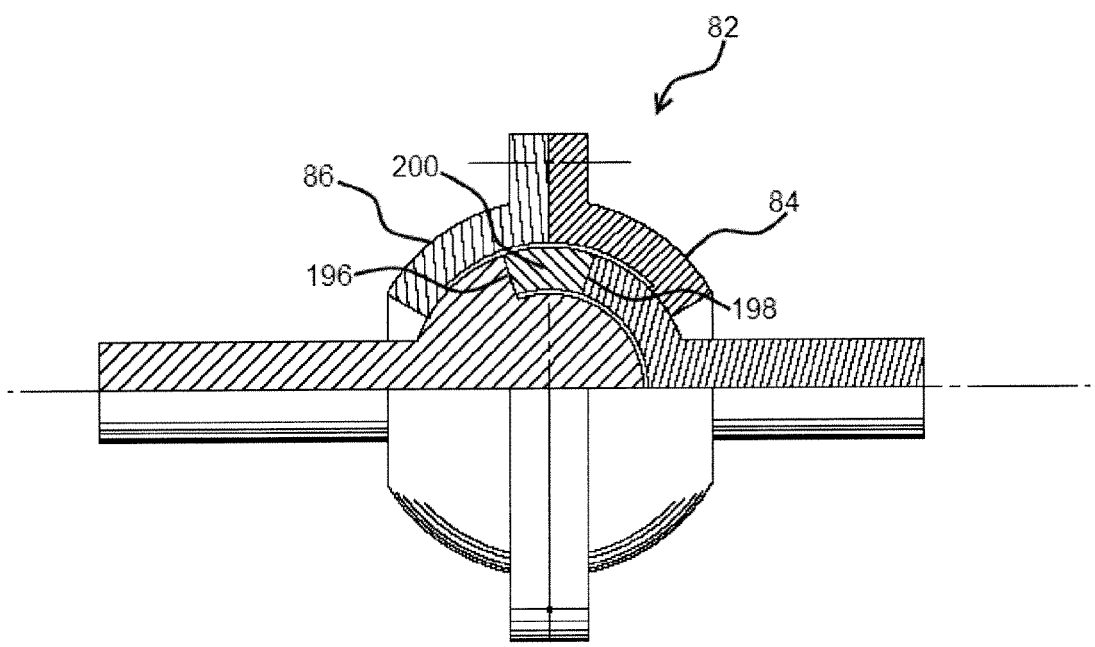
FIG. 54 is a partial cutaway view of an alternate embodiment of a CV joint.

In FIGS. 53 and 54, the outer flanged cover 82 comprises a first portion 84/140 and second portion 86/138, which is provided for two purposes: firstly to allow for a sealed lubricant inside the assembly and secondly to prevent the assembly from coming apart. Application of a torque to any of these CV joints may result in an axial expansion force that tends to separate the wave surfaces apart from each other, and to prevent this, an opposite and opposing force is provided to constrain the parts so that they do not come apart. This may be done locally on the assembly using outer spherical surfaces on an outer housing, or by the surrounding equipment holding the shafts with sufficient force. The embodiment shown in FIG. 50 is similar to the embodiment of FIG. 52 in the arrangement of the housing 156 relative to the end cap 158, in that the housing shaft 160 is rigidly attached to the housing 156 while the shaft 162 pivots relative thereto. In this embodiment, the shaft comprises a plurality of wave surfaces 164 and 166, which engage wave rings 168 and 170, which in turn engage wave surface 172 on the housing and 174 on the end cap through bearing sets 176, 178, 180, and 182, respectively.

Figure 51:
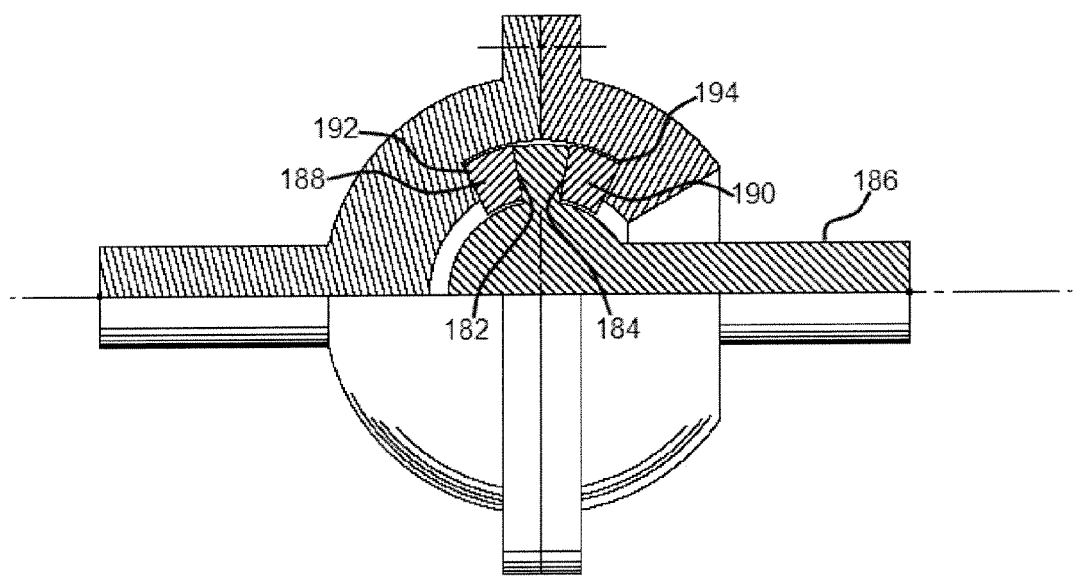
FIG. 51 is a partial cutaway view of an alternate embodiment of a CV joint.

The embodiment shown in FIG. 51 is similar to the embodiment shown in FIG. except that that the wave surfaces 183 and 184 of the shaft 186 directly engage wave rings 188 and 190, which in turn engage wave surfaces 192 and 194, respectively.

The embodiment shown in FIG. 54 is similar to the embodiment of FIG. 53 save that the bearing sets are not utilized, and the wave surfaces 196 and 198 directly engage the wave ring 200.

The surfaces used in all of the joint designs may be derived in the same manner as the wave surfaces defined in U.S. application Ser. No. 12/560,674. For bearing surfaces, this is the same formulation as for the bearing indexers. The geared surfaces, such as those shown in FIGS. 35-49, 51 and 54, are similar in manufacture as the trochoidal surfaces and conjugate pairs also described in U.S. application Ser. No. 12/560,674. To make a quieter running CV joint with gear pairs, the straight radial toothed lobes illustrated in the Figs. may be replaced with lobes of a spiral shape, similar to the spiral shape of a helical bevel gear, and this is also described in U.S. application Ser. No. 12/560,674.

The embodiment shown in FIGS. 1-20 may still be utilized for applications that do not expect to have side loads, and these applications may result in a more compact design of the joint assembly, reducing the required outer dimensions. When the bearings are in an "X" configuration, such as in FIGS. 21-34 and 50, the negative effects of side loading are at least partially reduced.

Many of the disclosed embodiments shown have a flanged outer housing. The outer housing need not be flanged (it could be threaded, welded, split down the axial direction rather than radial, etc.), nor does it need to be split exactly down the center of the device; this is shown only for illustrative purposes. Also in all of the designs, rubber boots, much like those in front wheel drive cars, could be placed on the open ends of the end caps and/or housings to keep the sealing surfaces or internal components clean from debris. Such rubber boots could also replace the need for seals illustrated in FIG. 38, as the rubber boot could hold the lubricant inside. The trochoidal surfaces shown are integral to shafts and housings in the illustrations, but these need not be integral and could be removable wear items. Also, for the configurations that take up both side load and tension and compression loads, spherical surfaces, such as the end of the right-hand shaft in FIG. 50, need not be spherical, as the sphere shape serves no purpose. The designs illustrated in this patent are conceptual only.

For the bearing designs, a properly designed cage is disclosed that ensures that the bearings are evenly spaced apart. One example of these cages is shown in FIG. 4 as cages 48, 50, 52, and 54. Such properly designed cages promote smoother operation of the overall apparatus. FIGS. 21-34 and 1-20 depict several embodiments of such properly designed cages.

Also, the number of possible designs using the one set or two sets of individual bearings, or one set or two sets of geared surfaces, is not limited to the Figs. shown. Other embodiments have not been illustrated, but they may follow the same concept of having wave surfaces connected or on an input and output shaft, and no, or one or more, wave rings, with or without bearings in between.

Figure 32:
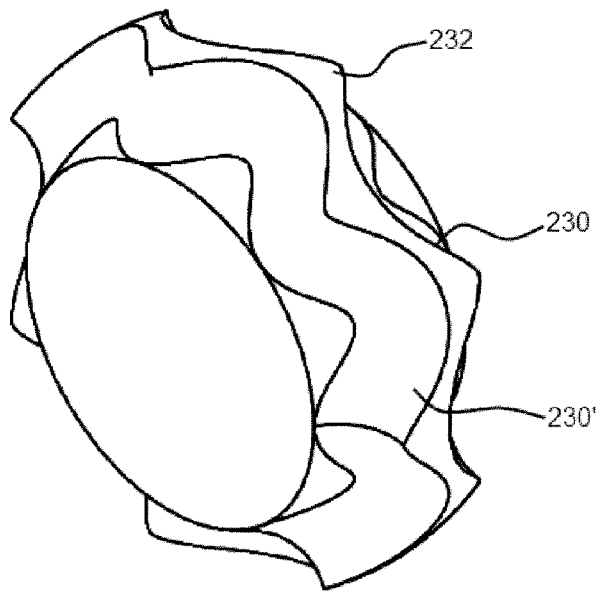
FIG. 32 is an isometric view of a wave ring portion of the embodiment of FIG. 21.
Figures 33, 34:
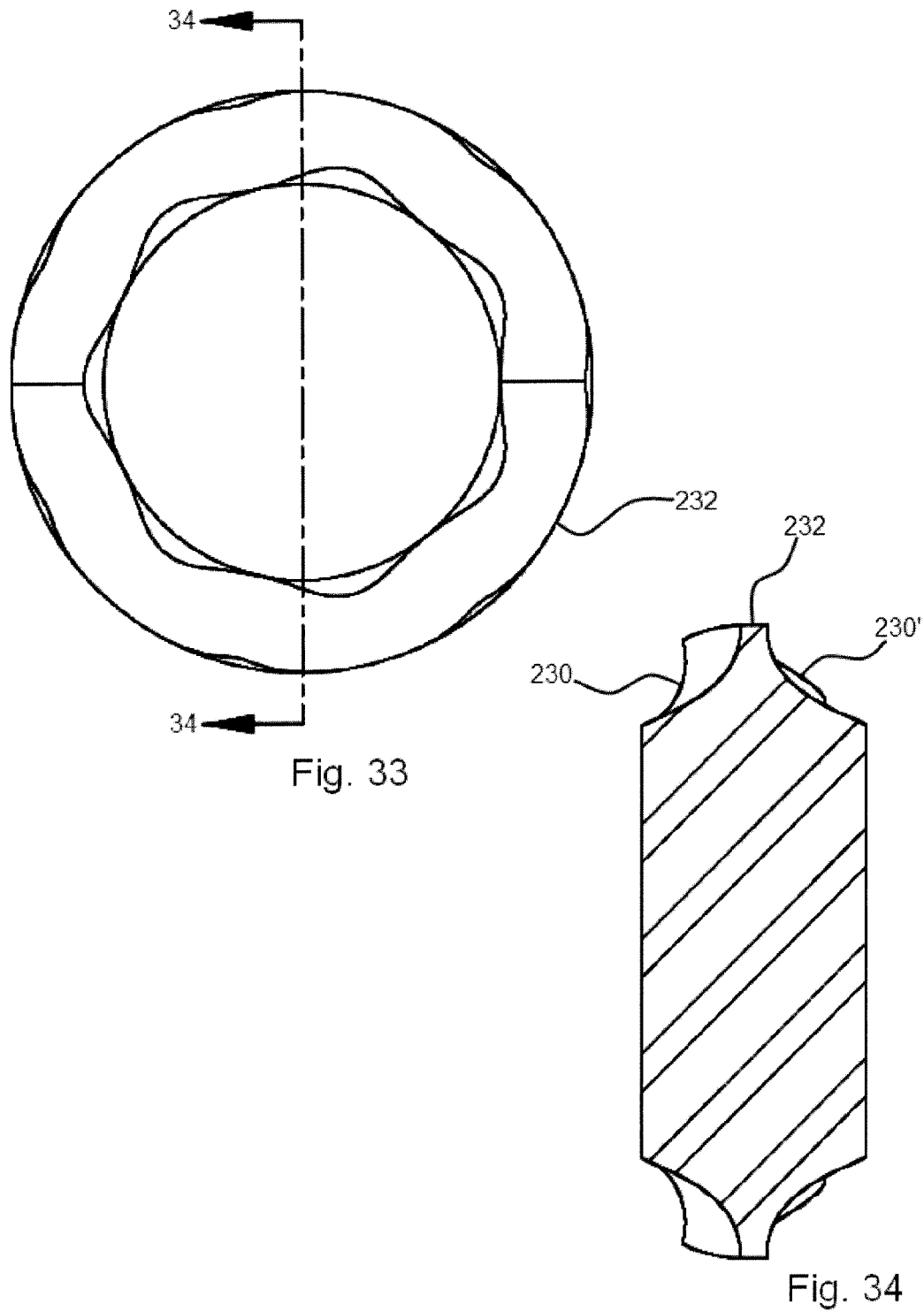
FIG. 33 is an end view of the embodiment of FIG. 32.
FIG. 34 is a cutaway view of the embodiment of FIG. 33 taken along line 34-34.
Figure 35:
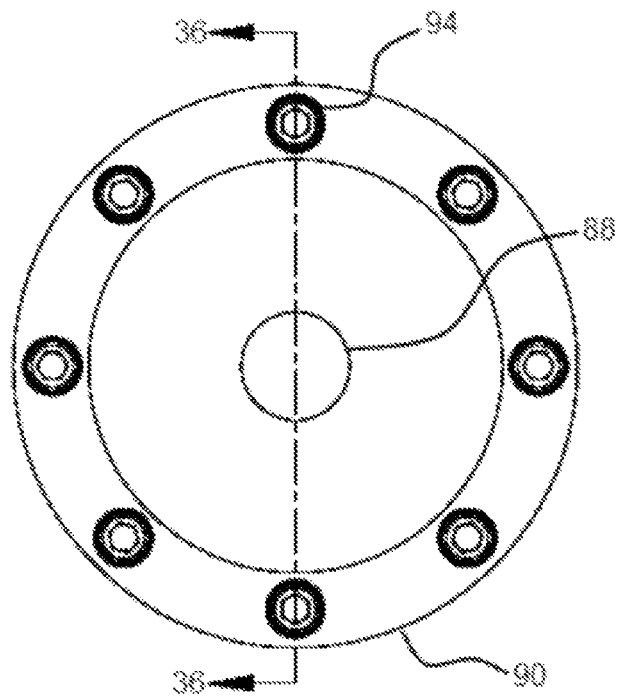
FIG. 35 is an end view of a second embodiment from that shown above.
Figure 36:
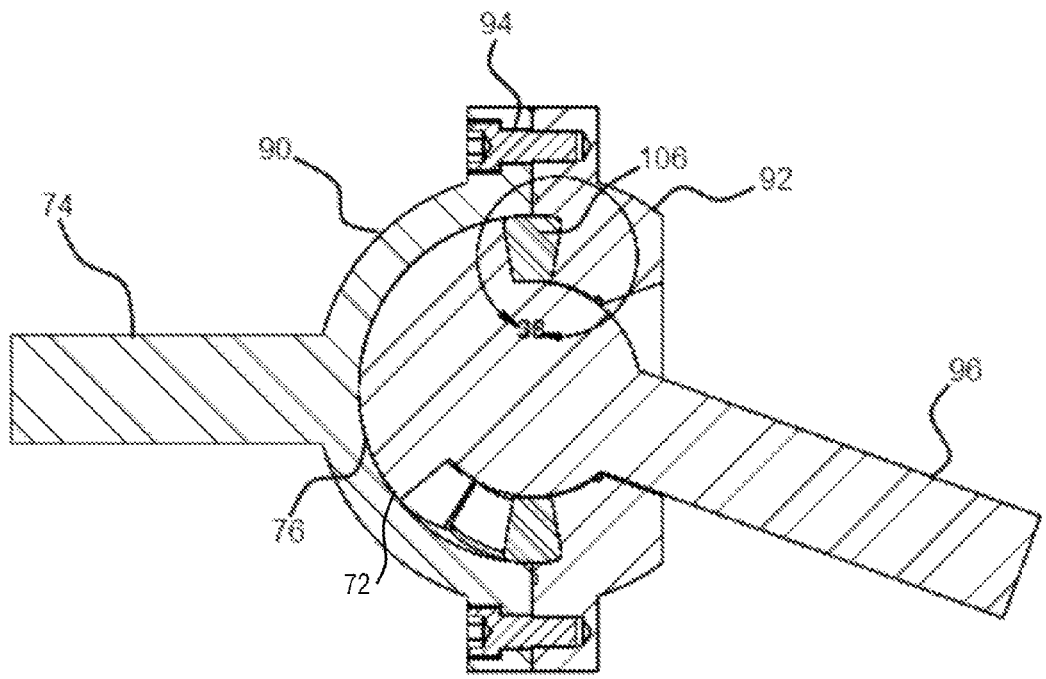
FIG. 36 is a cutaway view of the embodiment of FIG. 35 taken along line 36-36.
Figure 37:
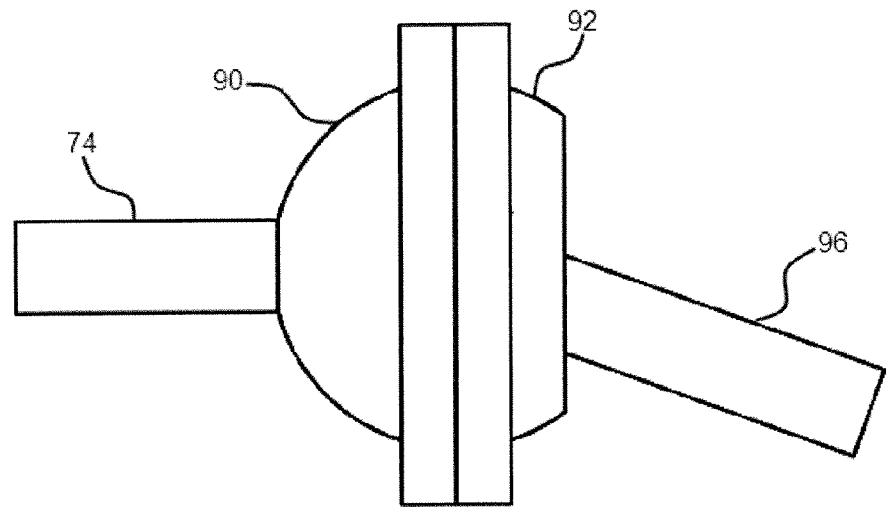
FIG. 37 is a side view of the embodiment of FIG. 35.
Figure 38:
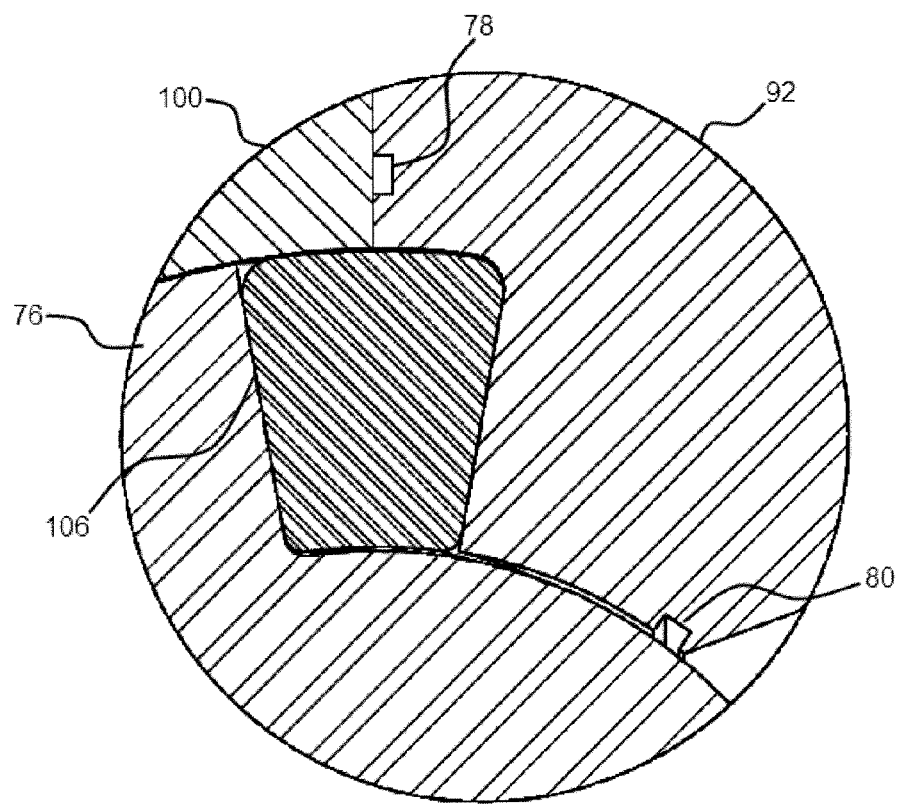
FIG. 38 is a detail view of a portion of FIG. 36.
Figure 39:
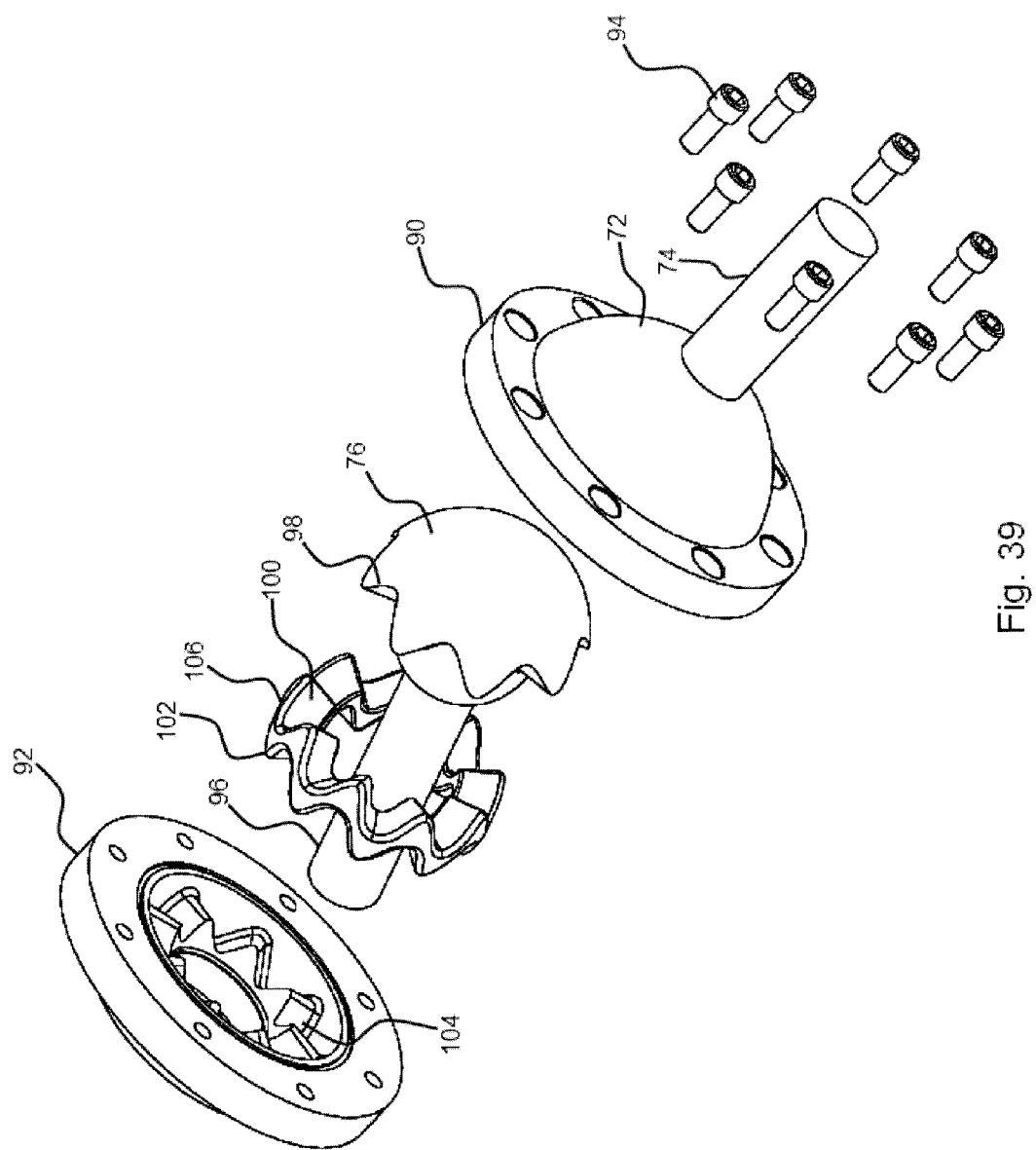
FIG. 39 is an isometric exploded view of the embodiment of FIG. 35.
Figure 40:
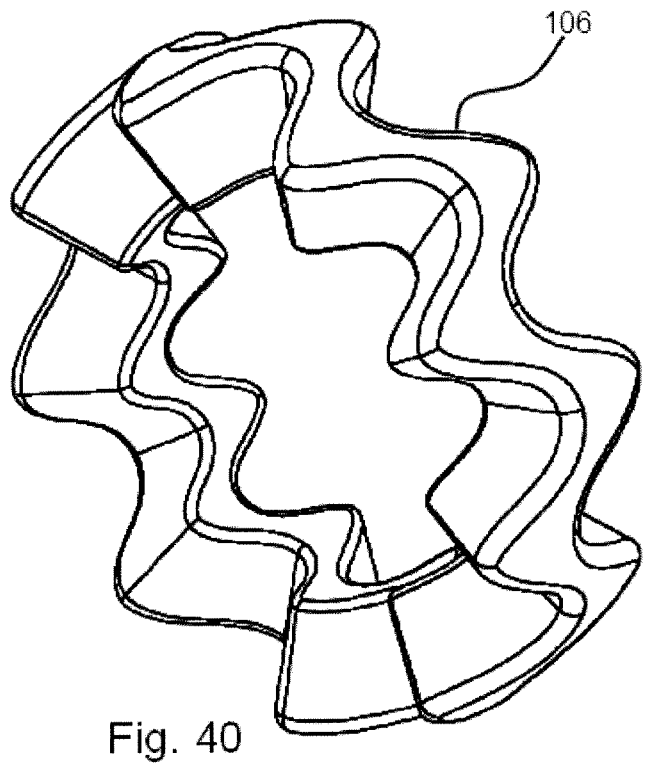
FIG. 40 is an isometric view of a wave portion of FIG. 39.
Figure 41:
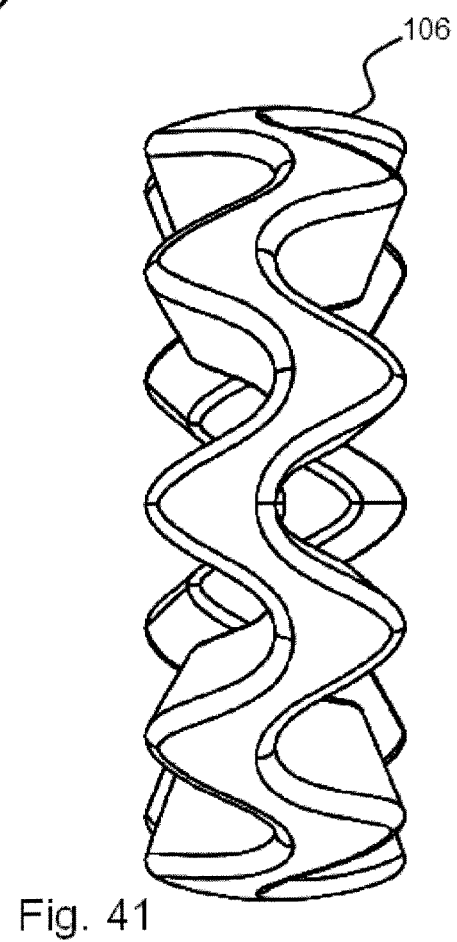
FIG. 41 is a side view of the embodiment of FIG. 40.
Figure 42:
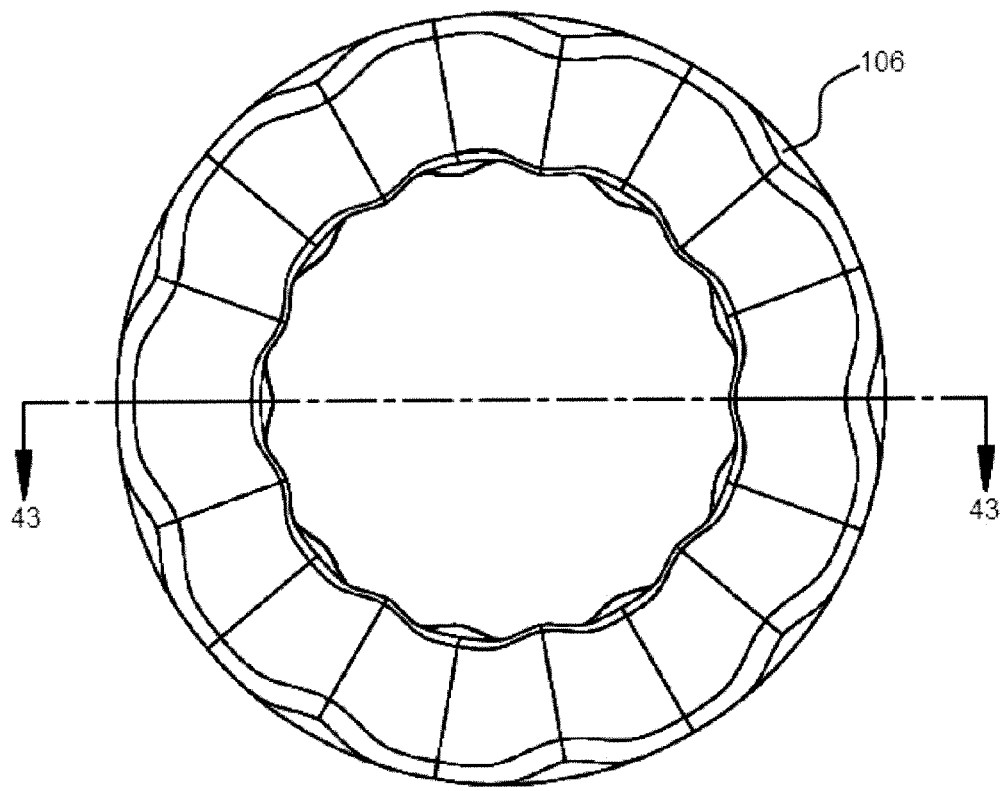
FIG. 42 is an end view of the embodiment of FIG. 40.
Figure 43:
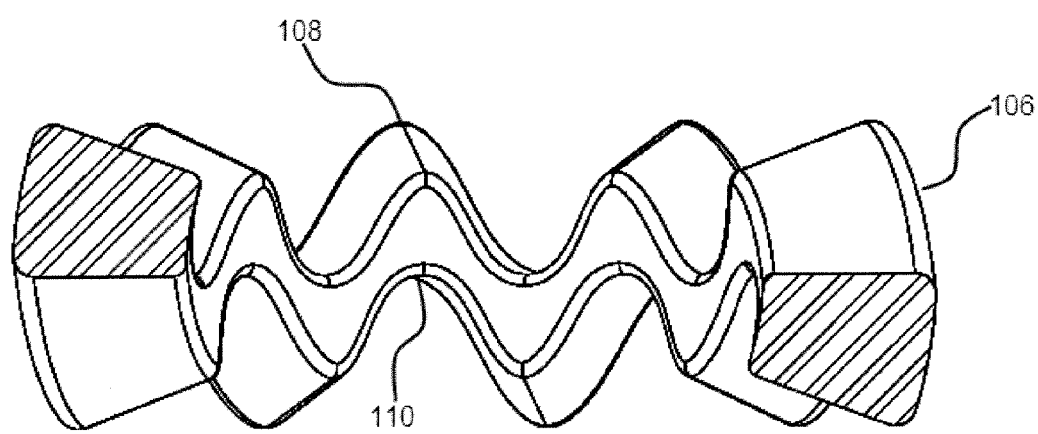
FIG. 43 is a cutaway view of the embodiment of FIG 40.
Figure 44:
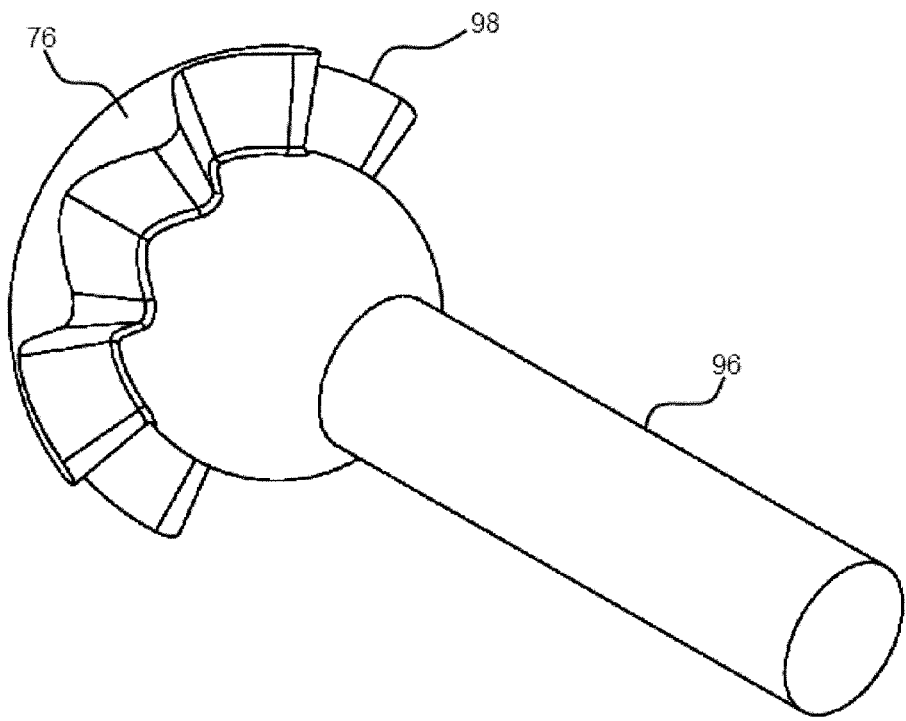
FIG. 44 is an isometric view of a shaft portion of FIG. 39.
Figure 45:
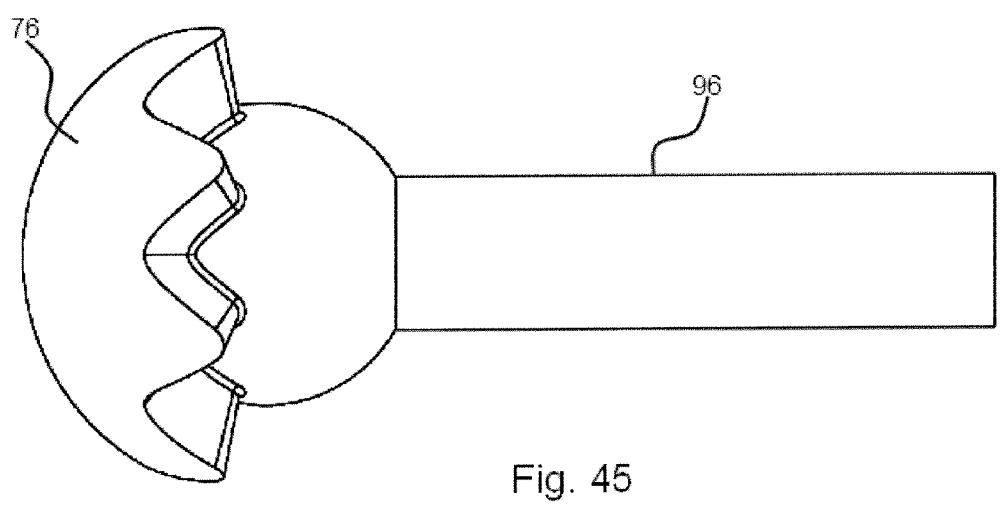
FIG. 45 is a side view of the embodiment of FIG. 44.
Figure 46:
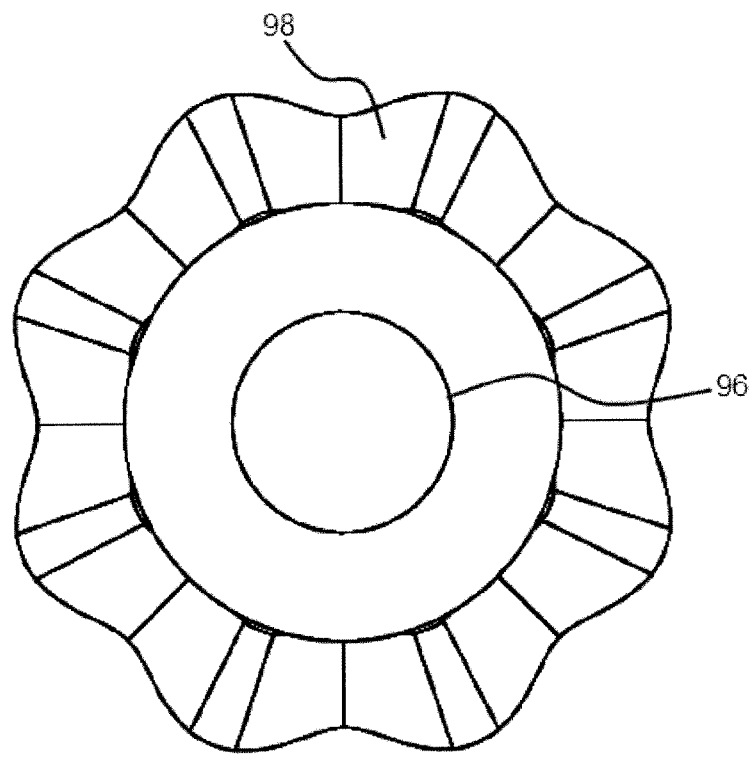
FIG. 46 is an end view of the embodiment of FIG. 45.
Figure 47:
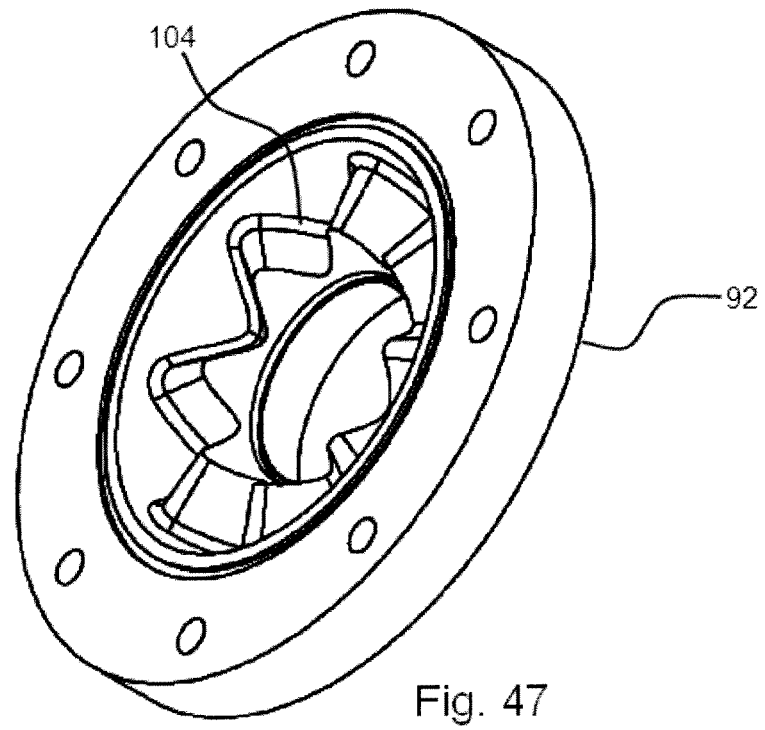
FIG. 47 is an isometric view of an end cap portion of FIG. 37.
Figure 48:
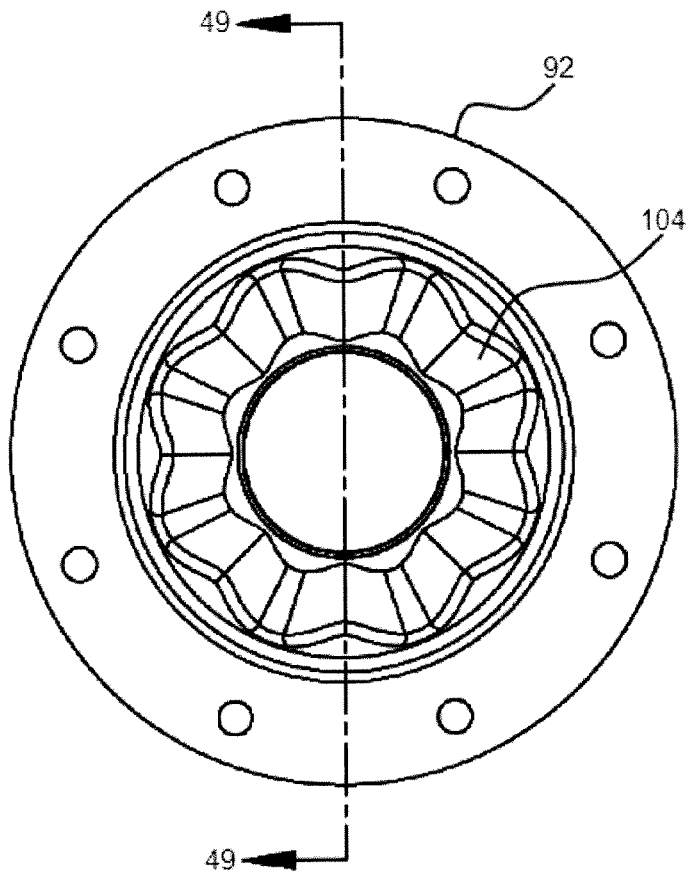
FIG. 48 is an end view of the embodiment of FIG. 47.
Figure 49:
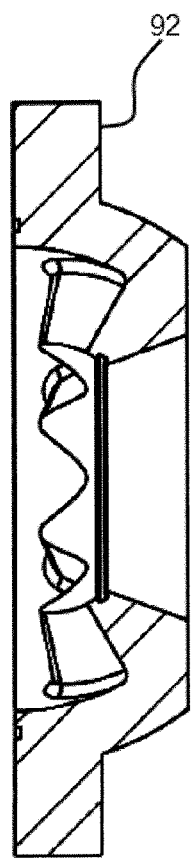
FIG. 49 is a cutaway view of the embodiment of FIG. 48 taken along line 49-49.

The embodiment shown in FIGS. 21-34 is slightly different in that the shafts 208 and 208' rotate about axes that are not required to be co-linear to each other and additionally may not be co-linear to the housing 210. Additionally, the housing in this embodiment and those previously described may comprise a plurality of end caps 212. As this embodiment is laterally symmetric, only one side will be described, and the opposing side using similar components with a denotation. This embodiment is comprised of symmetric or identical components and surfaces. Looking to FIG. 23, it can be seen how this embodiment differs from other embodiments to increase the joint's resilience to tensile and compressive and side load forces. The shaft 208 comprises a wave surface 216, which engages a bearing set 218, which may be contained by a cage 220. The bearing set 218 also engages a wave surface 222 on the end cap 212. On the opposing or inner side of the shaft 208 is provided another wave surface 224, which engages a bearing set 226. Once again, the bearing set 226 may be contained by a cage 228. The bearing set 226 engages a wave surface 230 provided on a wave ring 232. While previously a ring shaped device has been depicted, a disk shaped element may be used in this embodiment, as shown in FIG. 32.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A coupling comprising;
   a) an input shaft having a first wave surface thereupon;
   b) wherein the first wave surface comprises mounds and valleys;
   c) an output shaft having a second wave surface thereupon;
   d) wherein the second wave surface comprises mounds and valleys;
   e) a housing substantially enclosing the first wave surface and second wave surface;
   f) a wave ring comprising a first wave ring surface and a second wave ring surface on alternate lateral sides of the wave ring;
   g) each wave ring surface comprising a plurality of mounds and valleys;
   h) wherein the first wave ring surface is in geared contact with and transmits rotional force from the first wave surface of the input shaft to the wave ring without an appreciable variation of transmitted speed;
   i) wherein the second wave ring surface is in geared contact with the second wave surface of the output shaft and transmits rotational force from the wave ring to the second wave surface of the output shaft; and
   j) wherein the first wave surface of the input shaft and second wave surface of the output shaft transmit rotational force therebetween via the wave ring through a range of output angles, up to a maximum output angle, between a rotational axis of the input shaft relative to a rotational axis of the output shaft.

2. The coupling as recited in claim 1 wherein the input shaft is fixedly coupled to the housing to rotate and pivot therewith.

3. The coupling as recited in claim 1 further comprising a first bearing set positioned between the first wave surface and the second wave surface to transmit rotational force therebetween.

4. The coupling as recited in claim 1 wherein the wave surfaces on alternate lateral sides of the wave ring have the same number of mounds and valleys.

5. The coupling as recited in claim 1 further comprising
   a) a bearing set positioned between the first wave surface of the input shaft and the wave ring; and
   b) a bearing set positioned between the second wave surface of the output shaft and the wave ring.

6. The coupling as recited in claim 5 wherein the bearing sets are restrained in part by bearing cages.

7. The coupling as recited in claim 5 wherein the axis of rotation of the input shaft, the axis of rotation of the output shaft, and the axis of rotation of one or more wave rings, are non-collinear.

8. The coupling as recited in claim 1 comprising a bearing set positioned between the first wave surface of the input shaft and the wave ring.

9. The coupling as recited in claim 1 further comprising:
   a) a concave spherical surface provided within the housing;
   b) a convex spherical surface on the output shaft having a diameter which engages the diameter of the convex spherical surface; and
   c) whereupon compression forces exerted from the output shaft toward the input shaft are translated through the spherical surfaces and not through the wave surfaces.

10. The constant as recited in claim 9 further comprising a bearing set positioned between the concave spherical surface and the convex spherical surface.

11. The coupling as recited in claim 9 wherein the convex spherical surface on the output shaft having a diameter substantially identical to the diameter of the concave spherical surface provided within the housing.

12. The coupling as recited in claim 11 wherein:
   a) the housing comprises an end cap;
   b) wherein the outer housing is fastened directly to the end cap; and
   c) wherein the housing is fixed to and rotates with the input shaft and/or output shaft.

13. The coupling as recited in claim 12 wherein:
   a) the housing is fixed to the output shaft and rotates therewith;
   b) the input shaft comprises a convex spherical surface concentric with the concave spherical surface provided within the housing; and c) a seal grove between a concave spherical surface of the end cap and the convex spherical surface of the input shaft.

14. The coupling as recited in claim 1 wherein the axis of rotation of the input shaft, and the axis of rotation of the output shaft, are non-collinear.

15. The coupling as recited in claim 1 wherein the first wave ring surface is not in contact with the first wave surface of the input shaft at a point radially opposed to the contact point between the first wave ring surface and the first wave surface of the input shaft.

16. The coupling as recited in claim 1 wherein the second wave ring surface is not in contact with the second wave surface of the output shaft at a point radially opposed to the contact point between the second wave ring surface and the second wave surface of the output shaft.

* * * * *